US012712115B2

(12) United States Patent
Takabuchi et al.

(10) Patent No.: US 12,712,115 B2
(45) Date of Patent: Aug. 18, 2026

(54) TRANSFORMER, POWER CONVERSION DEVICE, PRODUCT GROUP OF TRANSFORMER, AND MANUFACTURING METHOD FOR TRANSFORMER

(71) Applicant: Mitsubishi Electric Corporation, Tokyo (JP)

(72) Inventors: Shingo Takabuchi, Tokyo (JP); Shogo Miki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 985 days.

(21) Appl. No.: 17/887,811

(22) Filed: Aug. 15, 2022

(65) Prior Publication Data

US 2023/0245816 A1 Aug. 3, 2023

(30) Foreign Application Priority Data

Jan. 31, 2022 (JP) ................................ 2022-012557

(51) Int. Cl.

*H01F 27/28* (2006.01)
*H01F 27/32* (2006.01)
*H02M 3/28* (2006.01)
*H02M 7/537* (2006.01)
*H01F 27/29* (2006.01)

(52) U.S. Cl.

CPC ..... *H01F 27/2852* (2013.01); *H01F 27/2876* (2013.01); *H01F 27/327* (2013.01); *H02M 3/28* (2013.01); *H02M 7/537* (2013.01); *H01F 27/29* (2013.01)

(58) Field of Classification Search

CPC ............ H01F 27/2852; H01F 27/2876; H01F 27/327; H01F 27/29; H01F 27/30; H01F 30/10; H01F 27/306; H01F 27/324; H01F 41/06; H02M 3/28; H02M 7/537; H02M 3/33573; H02M 1/10

USPC .................... 336/65, 83, 200, 206–208, 232

See application file for complete search history.

(56) References Cited

U.S. PATENT DOCUMENTS

2013/0188329 A1* 7/2013 Chang ...................... H05K 1/18 361/836
2023/0147093 A1* 5/2023 Hayase .................. H01F 27/28 363/17

FOREIGN PATENT DOCUMENTS

JP 2008004823 A * 1/2008
JP 2020-010480 A 1/2020

* cited by examiner

*Primary Examiner* — Tuyen T Nguyen
(74) *Attorney, Agent, or Firm* — Sughrue Mion, PLLC

(57) ABSTRACT

To obtain a transformer that can easily cope with various input voltage specifications and that has improved productivity. A transformer includes: a core portion for forming a magnetic circuit; a primary winding and a secondary winding wound at the core portion; and a first connection portion having a plurality of first conductive parts arranged with an insulation interval therebetween. One or both of the primary winding and the secondary winding are divided into a plurality of division windings, and each of the plurality of division windings of the at least one divided winding has a wound part wound at the core portion, and two extending members extending from both ends of the wound part. The first connection portion is connected to one of the two extending members of each of the plurality of division windings of the at least one divided winding.

20 Claims, 32 Drawing Sheets

FIG. 2

| | INPUT VOLTAGE Vin | OUTPUT VOLTAGE Vout | NUMBER OF PRIMARY TURNS N1 |
|---|---|---|---|
| 1 | 100V～200V | 14V | 6 |
| 2 | 200V～300V | 14V | 12 |

TRANSFORMER, POWER CONVERSION DEVICE, PRODUCT GROUP OF TRANSFORMER, AND MANUFACTURING METHOD FOR TRANSFORMER

BACKGROUND

The present disclosure relates to a transformer, a power conversion device, a product group of the transformer, and a manufacturing method for the transformer.

Due to environmental regulations and technological advancement related to automobiles in recent years, electric vehicles or hybrid vehicles in various vehicle classes are being developed and are becoming prevalent. A plurality of power conversion devices are mounted on a motorized vehicle in which a motor is used as a drive source, as in a hybrid vehicle or an electric vehicle. A power conversion device is a device that converts input current from DC to AC and from AC to DC, or converts input voltage to a different voltage. Specific examples of the power conversion device mounted on a motorized vehicle include a charger which converts commercial AC power to DC power to charge a high-voltage battery, a DC/DC converter which converts DC power of a high-voltage battery to DC power having different voltage, and an inverter which converts DC power from a high-voltage battery to AC power for a motor.

A DC/DC converter is mounted on a motorized vehicle in order to perform charging from a high-voltage lithium ion battery to a low-voltage lead battery, for example. In order to protect the surroundings from high voltage, the high-voltage lithium ion battery is insulated from a chassis and a low-voltage system. In a case of a DC/DC converter as well, insulation needs to be provided by, in general, a transformer, between the input side of high voltage and the output side of low voltage.

A transformer has a core for forming a magnetic circuit, a primary winding, and a secondary winding, and the primary winding serves as the high-voltage side, for example. A planar-type transformer has been disclosed (see Patent Document 1, for example). In the case of the planar type, a primary winding and a secondary winding are coaxially stacked. In the case of a center-tap-type transformer, a primary winding is disposed between two secondary windings. The primary winding has a greater number of turns than the secondary winding. Therefore, using a terminal away from the winding shaft of the primary winding as a start point, the primary winding is wound by several turns from the outer periphery toward the inner periphery, a terminal close to the winding shaft and a terminal of a primary winding of a different layer are connected together, the primary winding is wound by several turns from the inner periphery toward the outer periphery, and the other terminal of the primary winding of the different layer is used as an end point. The windings of different layers are connected to each other by welding, crimping, screwing, or the like.

Patent Document 1: Japanese Laid-Open Patent Publication No. 2020-10480

Due to prevalence of motorized vehicles these days, motorization is applied in various vehicle classes. According to the vehicle classes, the capacity of a high-voltage lithium ion battery is different, and thus, voltage thereof is also different. Therefore, a DC/DC converter needs to cope with various input voltage specifications. Meanwhile, lead battery voltage, which is low, is constant irrespective of the vehicle class. Therefore, it is necessary to cope with input voltage specifications, on the basis of the number of turns of the transformer. However, the transformer structure of Patent Document 1 above has a problem that the transformer cannot easily cope with various input voltage specifications. For example, when input voltage has changed, input current also changes, and thus, it is necessary to perform thermal design such that the heat generation amount due to increase in input current allows the transformer to be operable, in addition to change of the number of turns. This requires redesigning of the number of layers of the primary winding, the number of turns of each layer, the line width, the connection point of each layer, and the like. In addition, it is necessary to manufacture a different transformer for each specification of input voltage. Thus, in the manufacturing process, various kinds of transformers need to be managed, and thus, there is a problem that production management, inventory management, and the like are complicated.

SUMMARY

Therefore, an object of the present disclosure is to provide a transformer, a power conversion device, a product group of the transformer, and a manufacturing method for the transformer that can easily cope with various input voltage specifications and that have improved productivity.

A transformer disclosed in the present disclosure includes: a core portion for forming a magnetic circuit; a primary winding and a secondary winding wound at the core portion; and a first connection portion having a plurality of first conductive parts arranged with an insulation interval therebetween. One or both of the primary winding and the secondary winding are divided into a plurality of division windings, and each of the plurality of division windings of the at least one divided winding has a wound part wound at the core portion, and two extending members extending from both ends of the wound part. The first connection portion is connected to one of the two extending members of each of the plurality of division windings of the at least one divided winding. When the first connection portion has two of the first conductive parts, each of the two first conductive parts is an external connection part to be connected to outside and is a mutual connection part which mutually connects two or more of the extending members. When the first connection portion has three or more of the first conductive parts, each of two specific ones of the first conductive parts is the external connection part, or is the external connection part and is the mutual connection part, and each of one or more non-specific ones of the first conductive parts other than the two specific first conductive parts is the mutual connection part.

According to the transformer disclosed in the present disclosure, one or both of the primary winding and the secondary winding are divided into a plurality of division windings, and each of the plurality of division windings of the at least one divided winding has a wound part wound at the core portion, and two extending members extending from both ends of the wound part; the first connection portion is connected to one of the two extending members of each of the plurality of division windings of the at least one divided winding; when the first connection portion has two first conductive parts, each of the two first conductive parts is an external connection part and is a mutual connection part which mutually connects two or more extending members; and when the first connection portion has three or more first conductive parts, each of two specific first conductive parts is an external connection part, or is an external connection part and is a mutual connection part, and each of one or more non-specific first conductive parts other than the two specific first conductive parts is a mutual connection part. Therefore, series connection and parallel connection of the division windings can be switched by connection of the extending members at the first connection portion, and the number of turns of the transformer can be changed while the core portion and the wound parts are used in common without being changed. Thus, increase in the number of design steps when the number of turns has been changed and in the kinds of the transformer due to dedicated design is suppressed, and thus, a transformer that can easily cope with various input voltage specifications and that has improved productivity can be obtained.

BRIEF DESCRIPTION OF THE DRAWINGS

FIG. 2 is a table showing voltage of the power conversion device and the number of turns of a primary winding according to the first embodiment;

FIG. 7 is a schematic plan view showing a main part of the transformer according to the first embodiment;

DETAILED DESCRIPTION OF THE EMBODIMENTS

Figure 1:
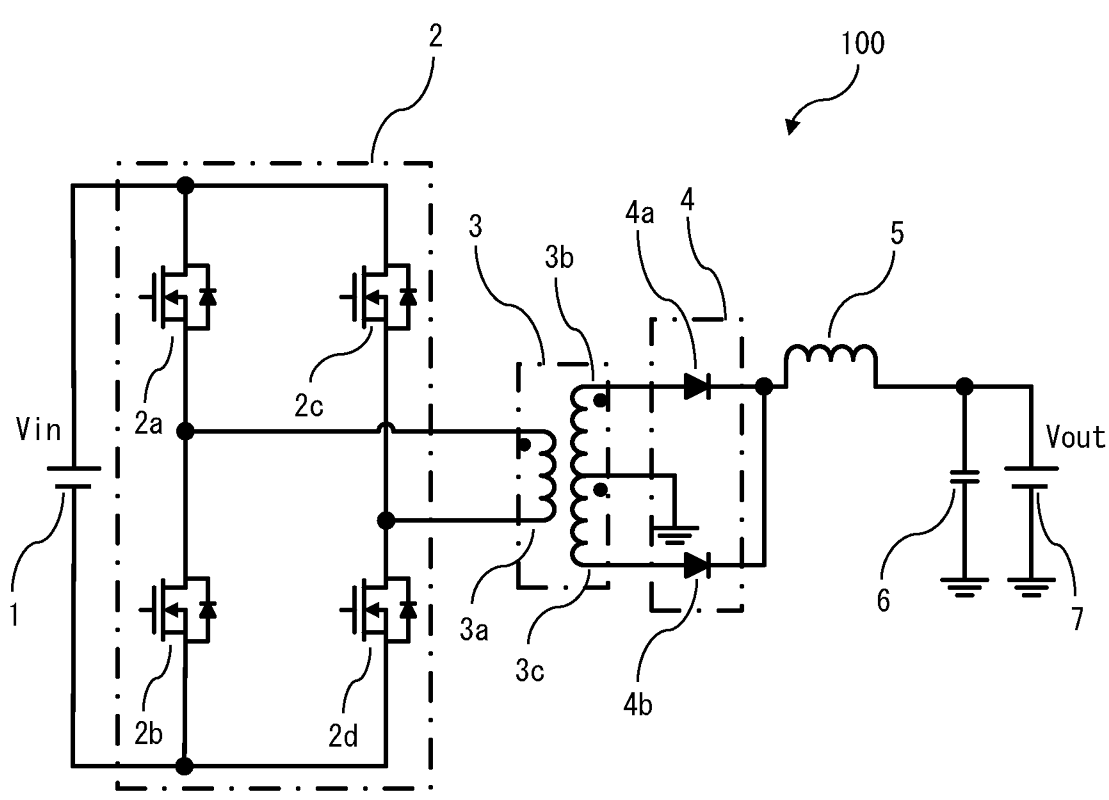
FIG. 1 shows a circuit configuration of a power conversion device according to a first embodiment.

Hereinafter, a transformer, a power conversion device, a product group of the transformer, and a manufacturing method for the transformer according to embodiments of the present disclosure will be described with reference to the drawings. In the drawings, the same or corresponding members and parts are denoted by the same reference characters, to give description.

First Embodiment

Figure 3:
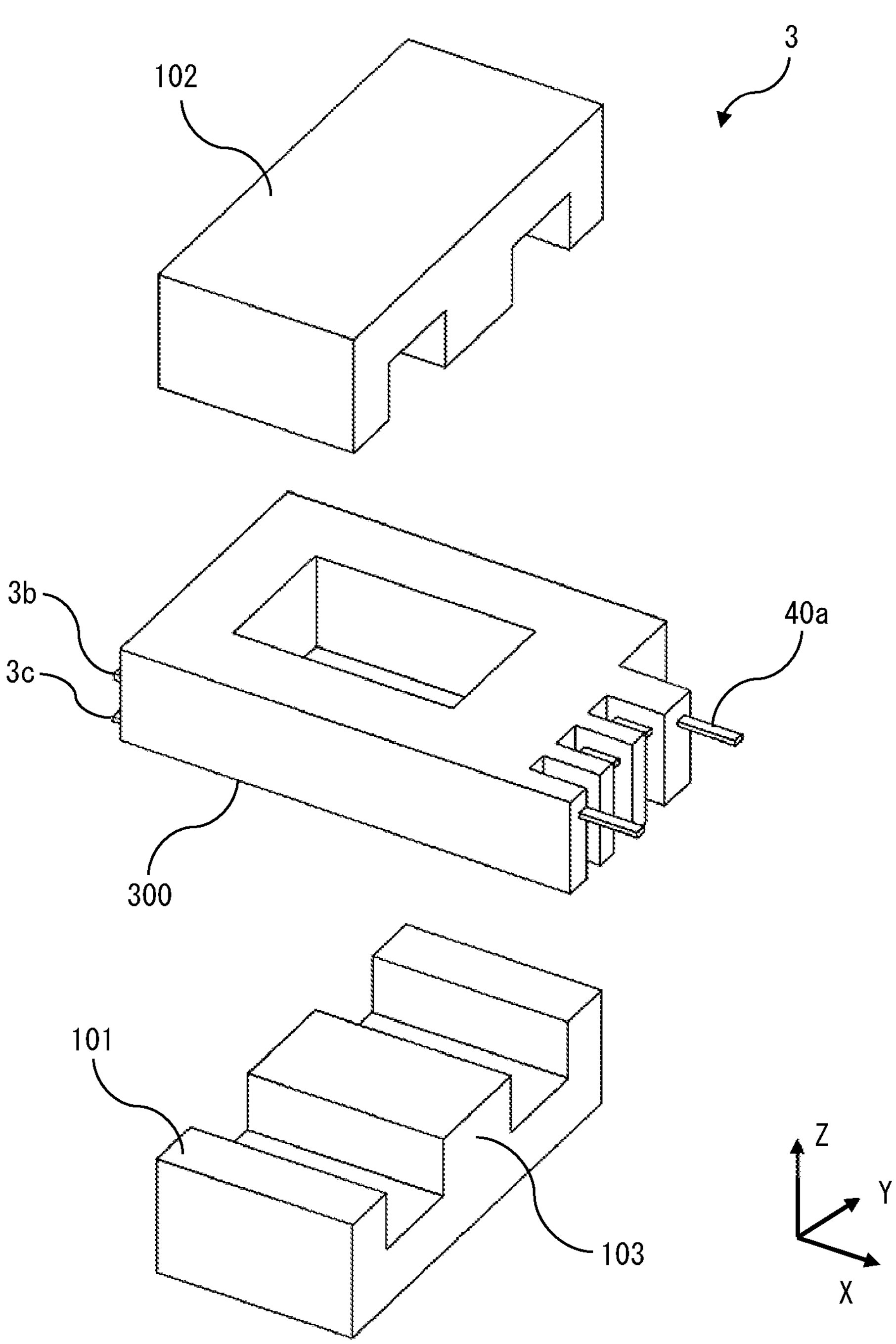
FIG. 3 is a schematic exploded perspective view showing a main part of a transformer according to the first embodiment.
Figure 4:
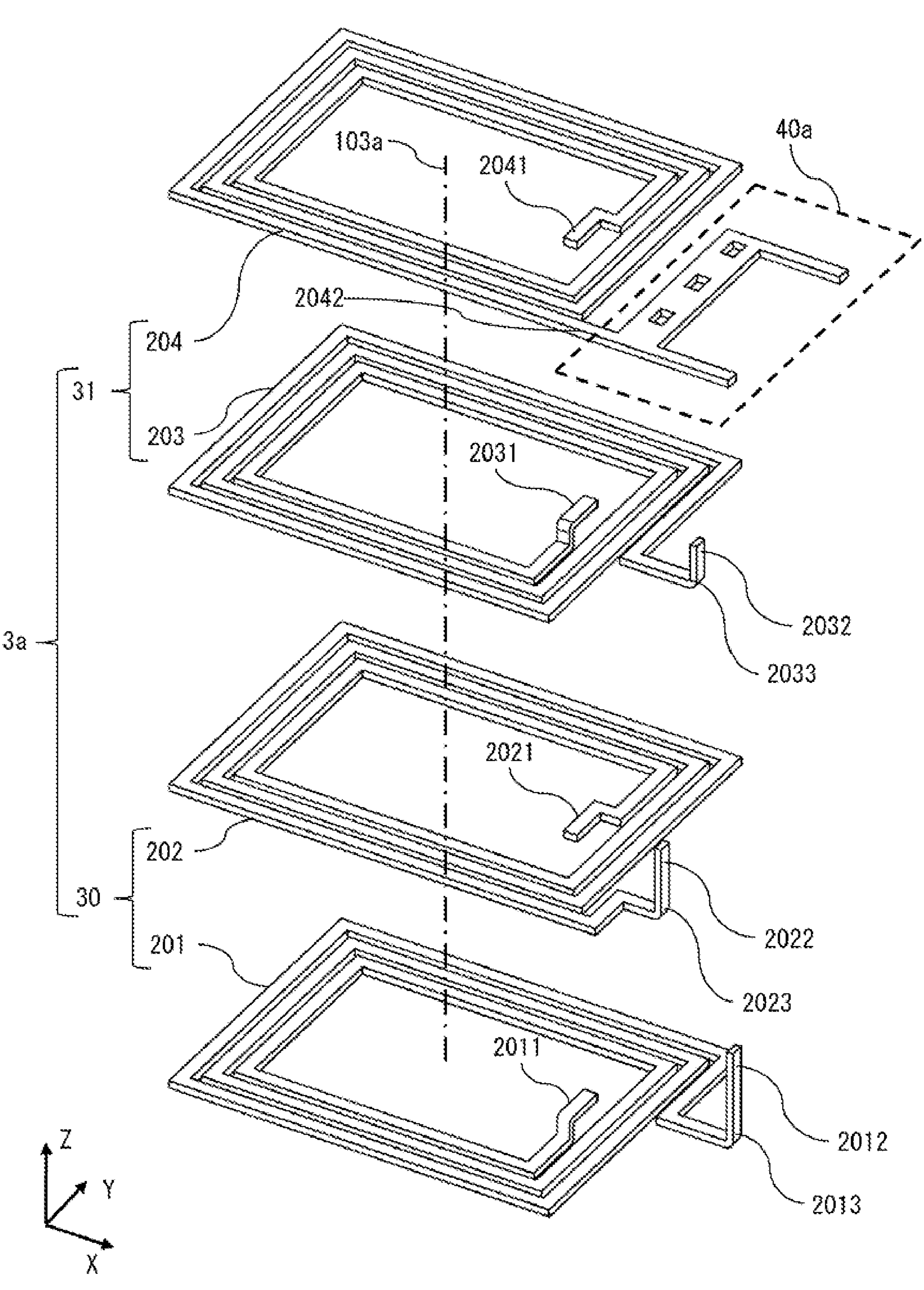
FIG. 4 is a schematic exploded perspective view showing the primary winding and a first connection portion of the transformer according to the first embodiment.
Figure 5:
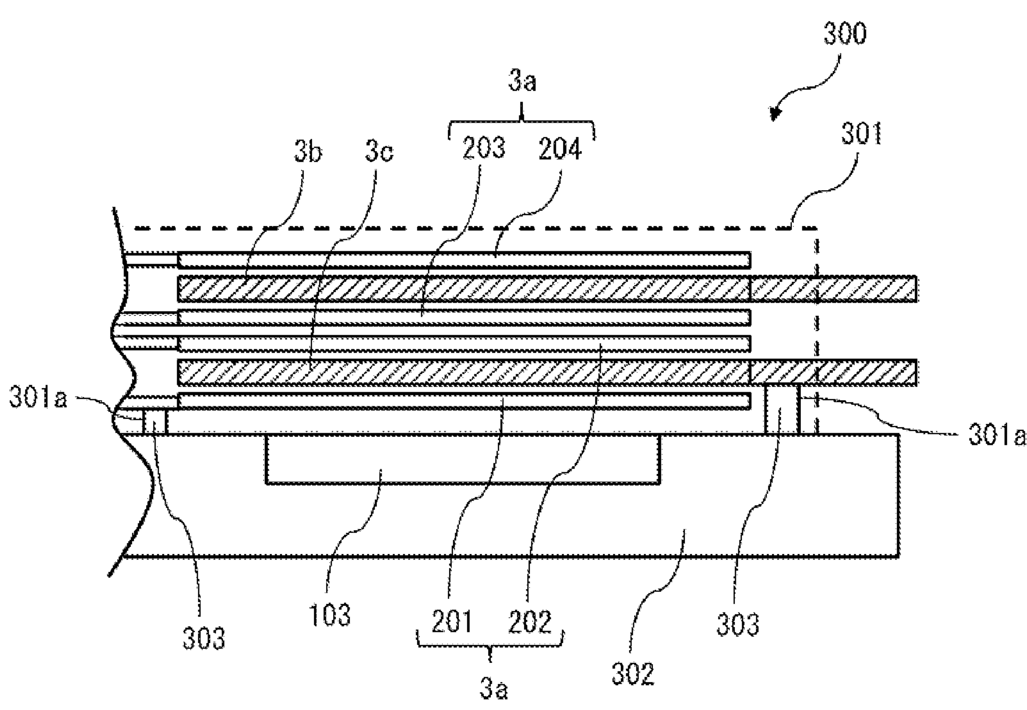
FIG. 5 is a schematic side view showing windings of the transformer according to the first embodiment.

FIG. 1 shows a circuit configuration of a power conversion device 100 according to a first embodiment. FIG. 2 is a table showing voltage of the power conversion device 100 and a number of turns N1 of a primary winding **3*a*. FIG. 3 is a schematic exploded perspective view showing a main part of a transformer 3. FIG. 4 is a schematic exploded perspective view showing the primary winding 3*a* and a first connection portion 40*a* of the transformer 3. FIG. 5 is a schematic side view showing windings of the transformer 3**.

Figure 6:
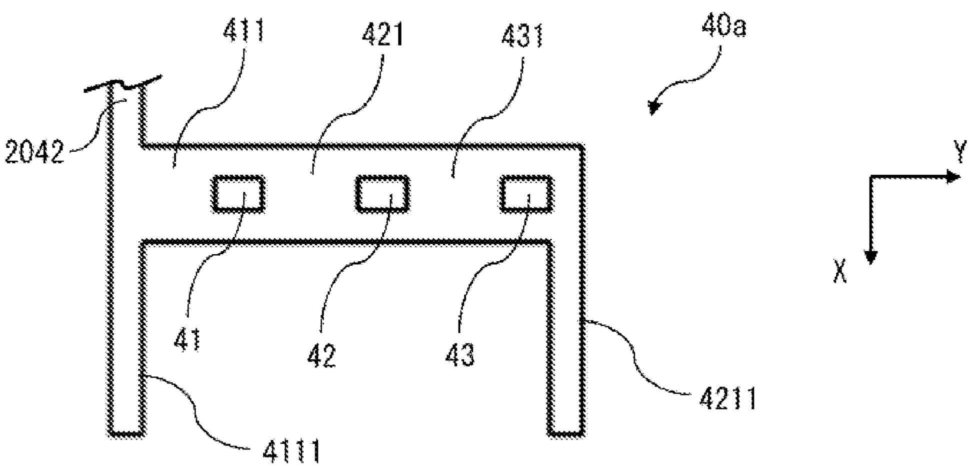
FIG. 6 is a schematic plan view showing the first connection portion of the transformer according to the first embodiment.
Figure 7:
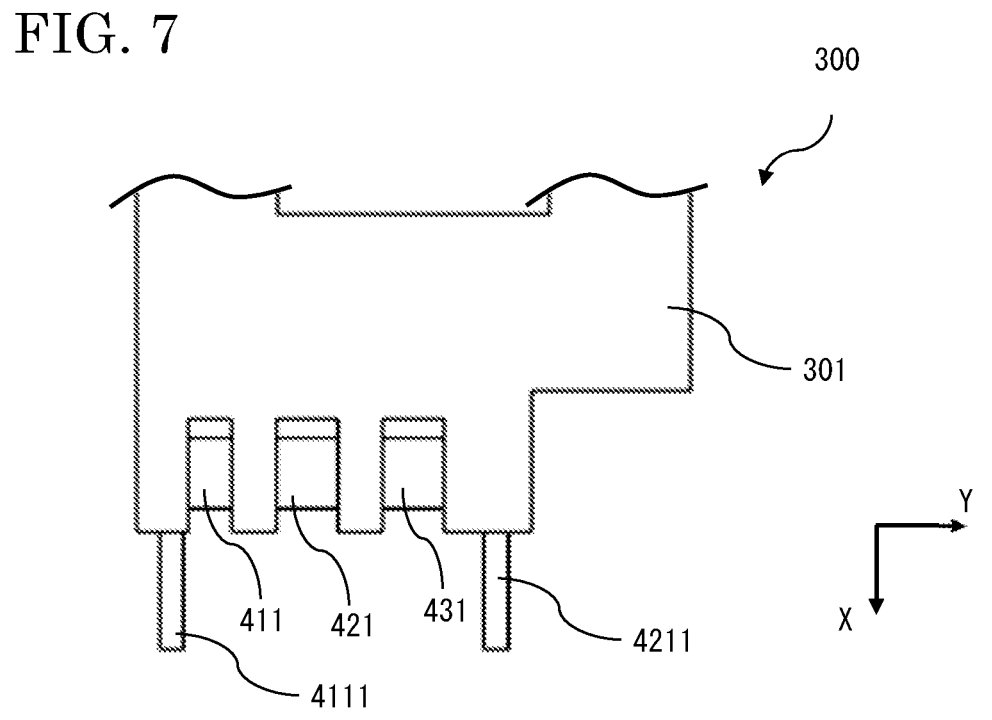
Figure 8:
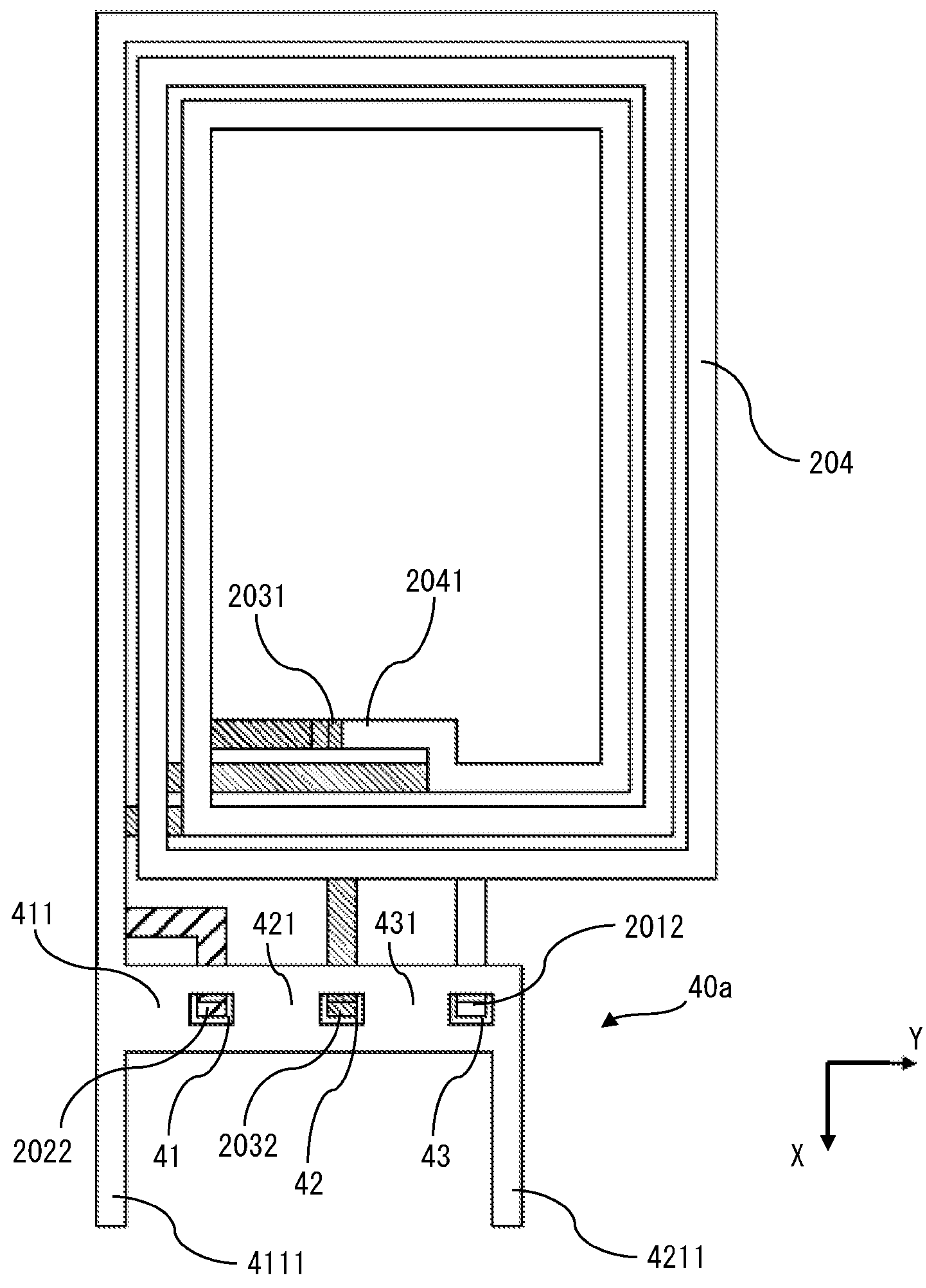
FIG. 8 is a schematic plan view showing the primary winding and the first connection portion of the transformer according to the first embodiment.
Figure 9:
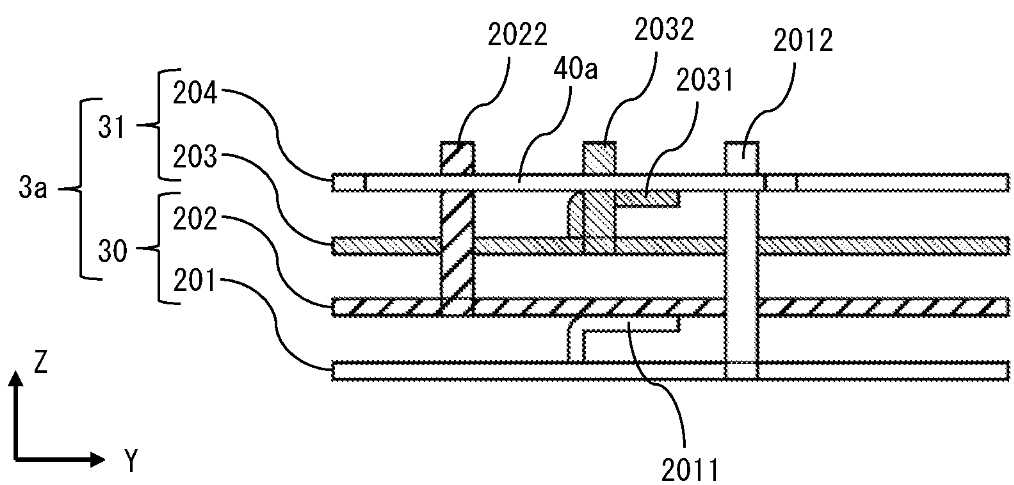
FIG. 9 is a schematic side view showing the primary winding and the first connection portion of the transformer according to the first embodiment.
Figure 10:
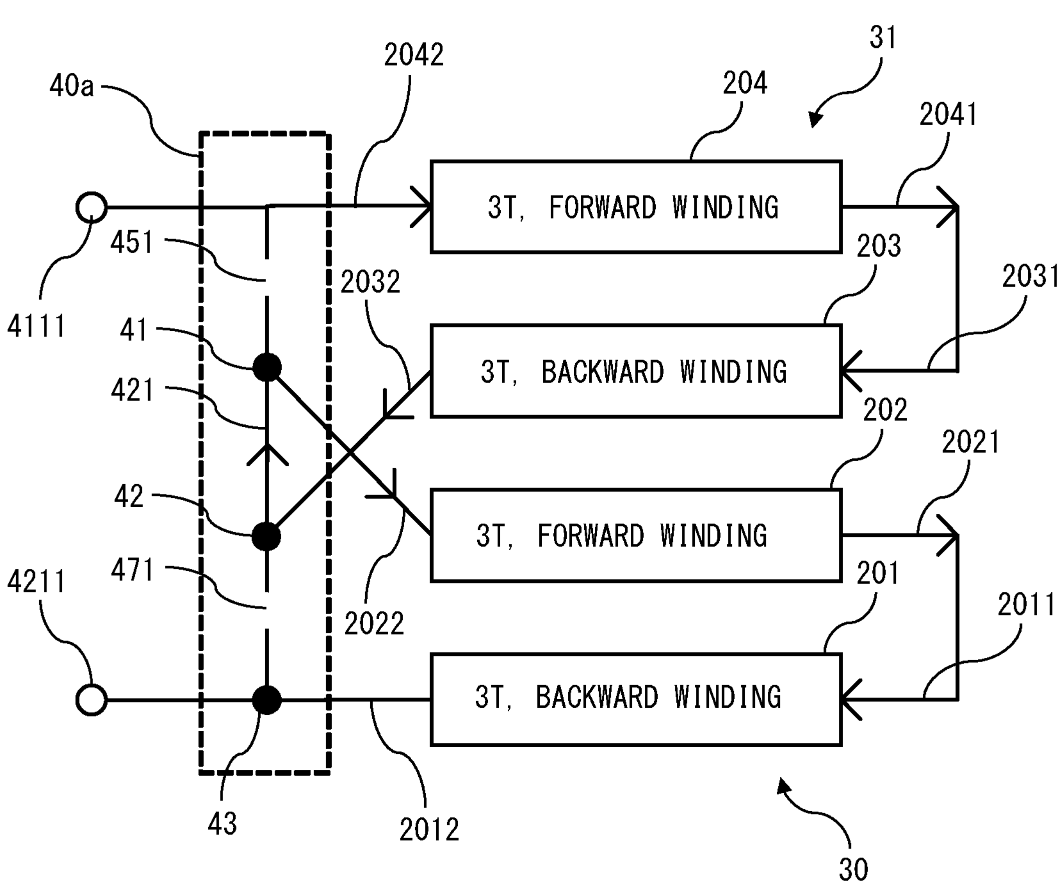
FIG. 10 is a wiring configuration diagram of the primary winding and the first connection portion of the transformer according to the first embodiment.
Figure 11:
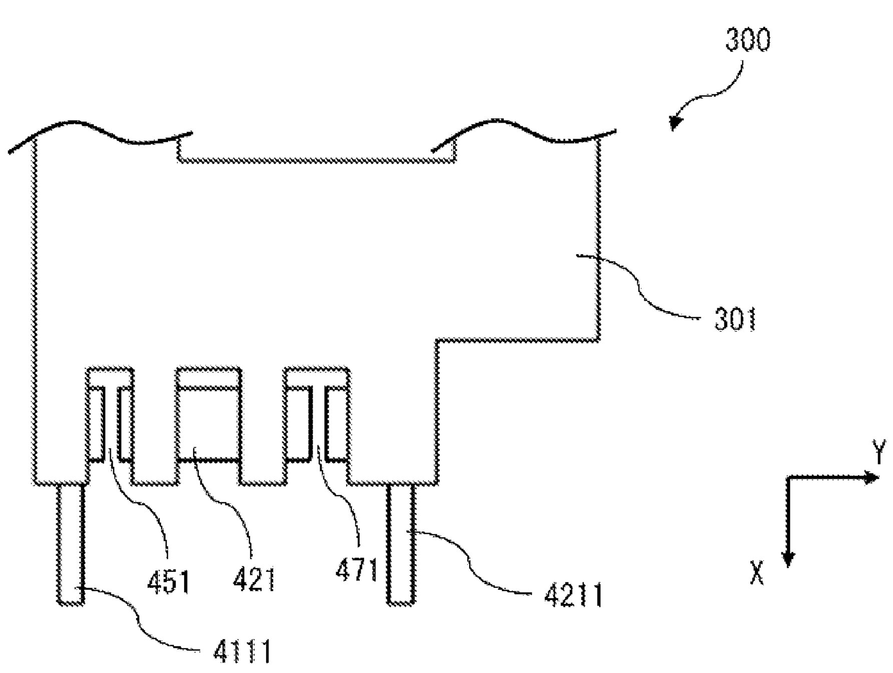
FIG. 11 is a schematic plan view showing a main part of the transformer according to the first embodiment.
Figure 12:
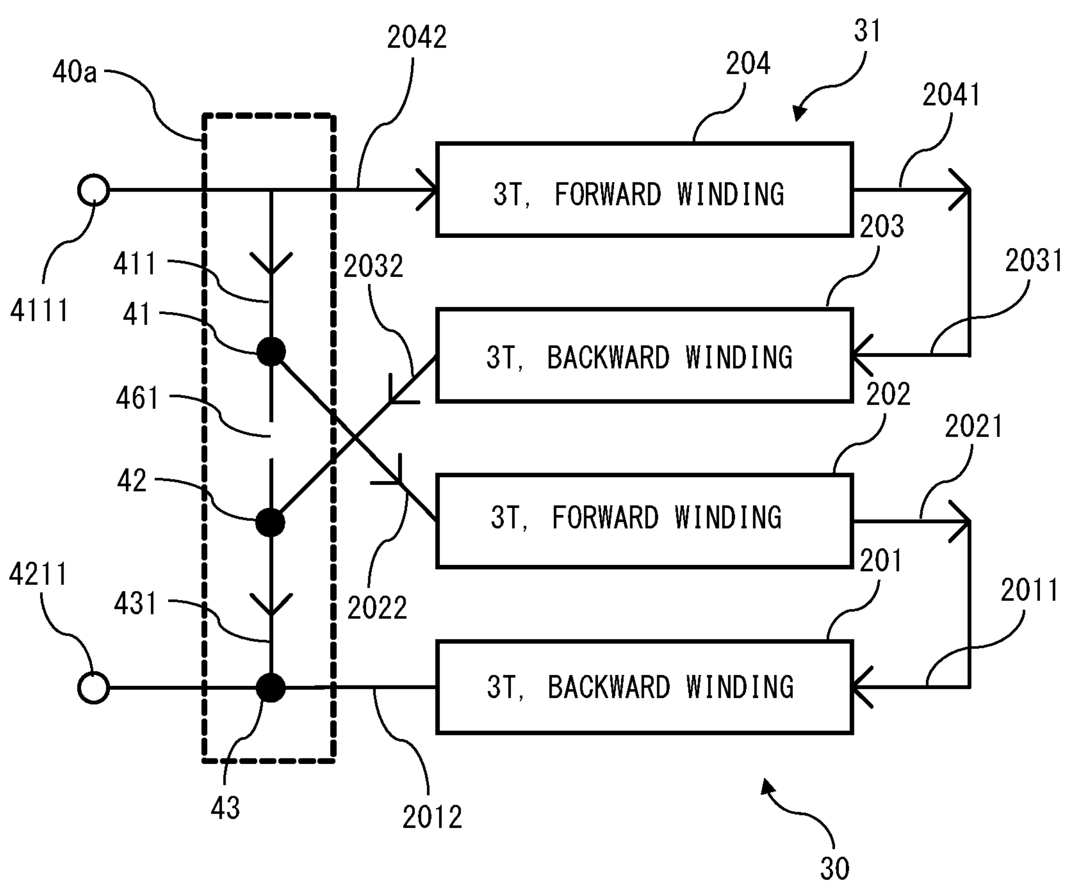
FIG. 12 is another wiring configuration diagram of the primary winding and the first connection portion of the transformer according to the first embodiment.
Figure 13:
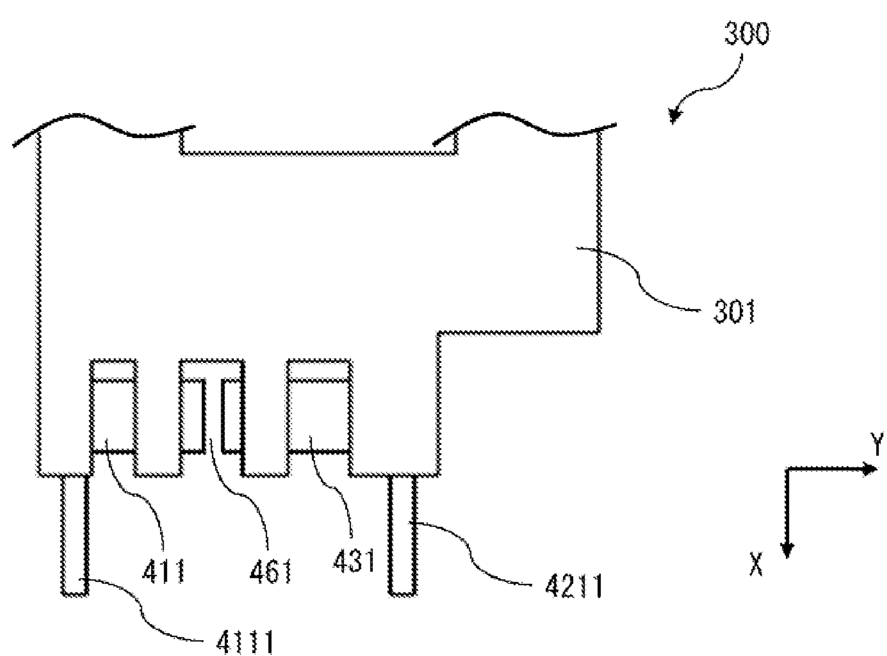
FIG. 13 is a schematic plan view showing a main part of the transformer according to the first embodiment.

FIG. 6 is a schematic plan view showing the first connection portion 40*a* of the transformer 3. FIG. 7 is a schematic plan view showing a main part of the transformer 3. FIG. 8 is a schematic plan view showing the primary winding 3*a* and the first connection portion 40*a* of the transformer 3. FIG. 9 is a schematic side view showing the primary winding 3*a* and the first connection portion 40*a* of the transformer 3. FIG. 10 is a wiring configuration diagram of the primary winding 3*a* and the first connection portion 40*a* of the transformer 3. FIG. 11 is a schematic plan view showing a main part of the transformer 3. FIG. 12 is another wiring configuration diagram of the primary winding 3*a* and the first connection portion 40*a* of the transformer 3. FIG. 13 is a schematic plan view showing a main part of the transformer 3. The power conversion device 100 is a device that converts DC voltage Vin of a DC power supply 1 to secondary-side DC voltage insulated by the transformer 3, to output DC voltage Vout to a load 7 such as a battery.

<Power Conversion Device 100>

An example of a main circuit configuration of the power conversion device 100 is described with reference to FIG. 1. In FIG. 1, the left side is the input side, and the right side is the output side. The power conversion device 100 includes: a single-phase inverter 2 connected to the DC power supply 1 and having a plurality of semiconductor switching elements 2*a*, 2*b*, 2*c*, 2*d* which convert inputted DC voltage Vin to AC voltage and output the AC voltage; the transformer 3 which is insulated and which converts the AC power voltage outputted from the single-phase inverter 2 and outputs the resultant voltage; and a rectification circuit 4 which rectifies output of the transformer 3. The DC power supply 1 is connected to the input side of the power conversion device 100, and the load 7 such as a low-voltage battery is connected to the output side. A reactor 5 and a smoothing capacitor 6 for smoothing the output are connected to the output side of the rectification circuit 4. The DC voltage Vout is outputted from the rectification circuit 4 to the load 7 via the reactor 5 and the smoothing capacitor 6.

The single-phase inverter 2 has the semiconductor switching elements 2*a*, 2*b*, 2*c*, 2*d* having a full-bridge configuration. The single-phase inverter 2 is connected to the primary winding 3*a* of the transformer 3. The semiconductor switching elements 2*a*, 2*b*, 2*c*, 2*d* are each a MOSFET (Metal Oxide Semiconductor Field Effect Transistor) having a diode provided between the source and the drain, for example. The semiconductor switching element 2*a*, 2*b*, 2*c*, 2*d* is not limited to a MOSFET, and may be a self-turn-off-type semiconductor switching element such as an IGBT (Insulated Gate Bipolar Transistor) to which a diode is connected in antiparallel. The semiconductor switching element 2*a*, 2*b*, 2*c*, 2*d* is formed on a semiconductor substrate formed from a semiconductor material such as silicon (Si), silicon carbide (SiC), or gallium nitride (GaN).

The rectification circuit 4 has diodes 4*a*, 4*b*, as rectification elements, which are semiconductor elements. The transformer 3 has the primary winding 3*a* and secondary windings 3*b*, 3*c*. In the transformer 3, the secondary side is a center tap type, and the center tap terminal is connected to the GND. Secondary-side terminals other than the center tap terminal are connected to anode terminals of the diodes 4*a*, 4*b*, respectively. Cathode terminals of the diodes 4*a*, 4*b* are connected to the reactor 5. The rectification circuit 4 rectifies low AC voltage outputted from the secondary windings 3*b*, 3*c*, to be converted into DC pulse voltage. The reactor 5 and the smoothing capacitor 6 smooth the DC pulse voltage.

As an example of the power conversion device 100, a DC/DC converter in which the secondary side is of a center tap type has been shown. However, the secondary side may have a full-bridge configuration. In addition, although a DC/DC converter in which the primary side is of a full-bridge type has been shown, another type may be adopted as long as the converter is an insulation-type converter having an insulated transformer, such as being of a forward type, a flyback type, or an LLC type.

<Winding Ratio and Heat Generation of Transformer 3>

Next, the reason why the winding ratio of the transformer 3 needs to be changed due to specifications of the input/output voltage is described using an example case where specifications of input voltage are changed. When the number of turns of the primary winding 3*a* of the transformer 3 is defined as N1, and the number of turns of the secondary winding 3*b*, 3*c* is defined as N2, a turn ratio N is represented by expression (1).

[Mathematical 1]

$$N = \frac{N2}{N1} \quad (1)$$

When the input voltage is defined as Vin, the output voltage is defined as Vout, and the duty of the semiconductor switching element 2*a*, 2*b*, 2*c*, 2*d* is defined as D, the turn ratio is represented by expression (2).

[Mathematical 2]

$$N > \frac{Vout}{Vin \cdot D} \quad (2)$$

In expression (2), the turn ratio N and the duty D allow degree of freedom of selection. In general, in a case where output voltage and output current to the load 7 of a DC/DC converter are constant, when the duty D is decreased and the turn ratio N is increased, the peak value of the current waveform in a rectangular wave shape of the semiconductor switching element 2*a*, 2*b*, 2*c*, 2*d* and the primary winding 3*a* of the transformer 3 is increased accordingly, and the effective value is increased. Therefore, in order to suppress loss of the DC/DC converter, the duty D is set to a maximum possible value, and the turn ratio N of the transformer 3 is set to be small, in general.

An example of a turn ratio N that is required is specifically described with reference to FIG. 2. For simplification, the power conversion device 100 is assumed to be a step-down-type DC/DC converter, and the number of turns of the secondary winding 3*b*, 3*c* is defined as N2=1. The specifications of first input/output voltage are defined such that input voltage is 100 V to 200 V and output voltage is 14 V, and the specifications of second input/output voltage are defined such that input voltage is 200 V to 300 V and output voltage is 14 V. In the single-phase inverter 2, a period in which the semiconductor switching elements 2*a*, 2*d* are on and the semiconductor switching elements 2*b*, 2*c* are off, and a period in which the semiconductor switching elements 2*a*, 2*d* are off and the semiconductor switching elements 2*b*, 2*c* are on are set to be substantially the same with each other, and these periods are alternately repeated. However, in order to prevent arm short-circuit, it is necessary to provide a dead time period in which all of the semiconductor switching elements 2*a*, 2*b*, 2*c*, 2*d* are off. Therefore, the maximum possible duty D is assumed to be 0.9. The turn ratio N needs to be set such that determined output voltage can be outputted at a minimum value in the range of input voltage. On the condition described above, when the number of primary turns N1 of the primary winding 3*a* of the transformer 3 is calculated using expression (2), the number of primary turns N1 needs to be 6 in the case of the specification of the first input/output voltage, and the number of primary turns N1 needs to be 12 in the case of the specification of the second input/output voltage, as shown in FIG. 2. That is, the number of primary turns N1 needs to be changed in accordance with the range of the specification of the input voltage. In addition, current becomes small in the primary winding 3*a* of which the number of turns is large.

Next, influence on the transformer 3 caused by change in the magnitude of current due to difference in the specification of input voltage is described. When the effective value of input current from the DC power supply 1 to the DC/DC converter is defined as Iin, and output current from the DC/DC converter to the load 7 is defined as Tout, the effective value of the input current is represented by expression (3).

[Mathematical 3]

$$Iin = \frac{Vout \cdot Iout}{Vin} \quad (3)$$

Here, for simplification, efficiency of the DC/DC converter is assumed to be 1. In a case where output power (=Vout× Iout) is constant, when input voltage decreases, input current increases in inverse proportion. Input current becomes maximum when input voltage is lowest in the range of the input voltage specification. Therefore, in the case of the specification of the first input/output voltage described above, the lower limit of the range of the input voltage is 100 V, and in the case of the specification of the second input/output voltage, the lower limit of the range of the input voltage is 200 V. With reference to Expression (3), the input current according to the specification of the first input/output voltage flows in an amount two times the input current according to the specification of the second input/output voltage. Therefore, as the transformer 3, when the number of primary turns N1 is changed from 12 to 6 in a case where the specification of the second input/output voltage is changed to the specification of the first input/output voltage, the amount of the current that flows in the primary winding 3*a* is doubled. Therefore, due to winding loss caused by the doubled amount of current, it is necessary to change the winding cross-sectional area of the primary winding 3*a* such that the heat generation amount of the primary winding 3*a* of the transformer 3 is in a range that allows the transformer to be operable. That is, in accordance with the range of the specification of input voltage, not only the number of primary turns N1 needs to be changed, but also designing to cope with increase in the current of the primary winding 3*a* due to the change of the number of primary turns N1 needs to be performed.

<Configuration of Transformer 3>

A configuration of the transformer 3 is described. The transformer 3 includes: a core portion for forming a magnetic circuit; the primary winding 3*a* and the secondary winding 3*b*, 3*c* wound at the core portion; and the first connection portion 40*a* having a plurality of first conductive parts arranged with an insulation interval therebetween. A part or the entirety of the primary winding 3*a* and the secondary winding 3*b*, 3*c* is sealed by a resin member 301. The part sealed by the resin member 301 is a winding body 300 shown in FIG. 3. Since the spaces between the windings and the outer peripheral part of each winding are covered by the resin member 301, insulation performance of each winding can be ensured. A part of an external connection part and a part of a mutual connection part of the first connection portion 40*a* connected to the primary winding 3*a* are exposed from the resin member 301. The first connection portion 40*a* is connected to the single-phase inverter 2 at an exposed part of the external connection part. Details of the first connection portion 40*a* will be described later. Parts, of the secondary windings 3*b*, 3*c*, to be connected to the outside are also exposed from the resin member 301. The secondary windings 3*b*, 3*c* are connected, at the parts connected to the outside, to the rectification circuit 4. As shown in FIG. 5, the transformer 3 includes a cooler 302 thermally connected to the resin member 301. The cooler 302 dissipates heat generated when current flows in the transformer 3, to the outside. The resin member 301 has, on the cooler 302 side, exposure portions 301*a* in which a part of one or both of the primary winding 3*a* and the secondary winding 3*b*, 3*c* is exposed. In FIG. 5, only some of the exposure portions 301*a* are shown. One or both of the primary winding 3*a* and the secondary winding 3*b*, 3*c* are each thermally connected, at the exposure portion 301*a*, to the cooler 302 via a heat transfer member 303 having an insulation property.

The core portion includes: an outer peripheral core having a ring shape; and a winding shaft 103 being the center core having a columnar shape and connecting two parts opposed to each other in the outer peripheral core. The primary winding 3*a* and the secondary windings 3*b*, 3*c* are wound around the winding shaft 103. With this configuration, the primary winding 3*a* and the secondary windings 3*b*, 3*c* can be efficiently wound at the core portion having a closed magnetic path structure. The core portion is made from a magnetic material such as ferrite. In the present embodiment, as shown in FIG. 3, the core portion includes a lower core 101 and an upper core 102. The lower core 101 and the upper core 102 each formed in an E shape are stacked with each other, whereby the core portion having a closed magnetic path structure is formed. The core portion need not necessarily be composed of the lower core 101 and the upper core 102 each formed in an E shape, and may be composed of two division cores formed in an E shape and an I shape. Although the shape of the abutting faces of the lower core 101 and the upper core 102 is rectangular, the shape of the abutting faces may be in another shape such as a square or a circle. In the present embodiment, as shown in FIG. 4, an example of the transformer 3 having a planar shape in which windings each implemented by a sheet metal are stacked is described. However, the configuration shown in the present disclosure is not limited to a transformer having a planar shape.

One or both of the primary winding 3*a* and the secondary winding 3*b*, 3*c* are divided into a plurality of division windings. Each of the plurality of division windings of the at least one divided winding has a wound part wound at the core portion, and two extending members extending from both ends of the wound part. The first connection portion 40*a* is connected to one of the two extending members of each of the plurality of division windings of the at least one divided winding. The first connection portion 40*a* sets the number of turns in the transformer of the at least one divided winding, by the part of the insulation interval and the mutual connection part which mutually connects two or more extending members. With this configuration, without changing the configurations of the primary winding 3*a* and the secondary winding 3*b*, 3*c*, the number of turns in the transformer can be set by the first connection portion 40*a*. Therefore, the transformer 3 that can easily cope with various input voltage specifications and that has improved productivity can be easily obtained. In the present embodiment, the primary winding 3*a* is the plurality of division windings of the at least one divided winding. The other of the two extending members of each of the plurality of division windings is mutually connected. In the following, details of the configuration of the primary winding 3*a* are described.

<Configuration of Primary Winding 3*a*>

First, a configuration example of the primary winding 3*a* realized when the number of turns N1 of the primary winding 3*a* is 6 or 12, with the number of turns N2 of the secondary winding 3*b*, 3*c* defined as 1, is described. An alternate long and short dash line in FIG. 4 showing the configuration example of the primary winding 3*a* is a winding axis 103*a* indicating the extending direction of the winding shaft 103. In the description of the present disclosure, the extending direction of the winding axis 103*a* is defined as a z-direction, and two directions orthogonal to the z-direction and orthogonal to each other are defined as an x-direction and a y-direction. In the present embodiment, a winding, out of the primary winding 3*a* and the secondary winding 3*b*, 3*c*, that has a greater number of turns of the wound part, is the plurality of division windings of the at least one divided winding. When the first connection portion 40*a* is provided to the winding that has a greater number of turns, thereby enabling changing of the number of turns, a greater number of connection patterns of the extending members can be configured. In addition, a turn ratio that is required as a transformer can be easily adjusted with respect to the number of turns of the other winding.

The primary winding 3*a* and the secondary winding 3*b*, 3*c* are formed by a plurality of winding members. Each of the plurality of winding members is formed in a shape of a plate that is curved on the same plane orthogonal to the extending direction of the winding shaft 103 which is the part of the core portion and around which the winding is wound. Each surface of the plate is orthogonal to the extending direction of the winding shaft 103. The plurality of winding members are stacked in the extending direction of the winding shaft 103. Each winding member of the primary winding 3*a* shown in FIG. 4 is a division winding, and is made from copper, for example. The wound part in each winding member of the primary winding 3*a* shown in FIG. 4 is in a spiral shape that has parts curved at a right angle. However, the shape of the wound part is not limited thereto, and may be a circular shape, or an elliptical shape.

In the present embodiment, the winding members of the primary winding 3*a* are stacked such that, from the Z-axis negative direction side in FIG. 4 in order, a first primary winding 201, a second primary winding 202, a third primary winding 203, and a fourth primary winding 204 are arranged. The resin member 301 (not shown in FIG. 4) for insulation is inserted between the windings. For example, as shown in FIG. 5, the secondary winding 3*c* is provided between the first primary winding 201 and the second primary winding 202, and the secondary winding 3*b* is provided between the third primary winding 203 and the fourth primary winding 204, in a stacked manner. With this configuration, electromagnetic connectivity between the primary windings and the secondary windings can be improved, and leakage inductance can be reduced. The stacking configuration of the primary winding 3*a* and the secondary winding 3*b*, 3*c* is not limited thereto. The outer shapes in the x-direction and the y-direction of the primary winding 3*a* and the secondary winding 3*b*, 3*c* are configured to be aligned with each other. One of the two extending members of each of the winding members, being the division windings, of the primary winding 3*a* extends from an end portion on the side far from the winding shaft 103, and the other of the two extending members of each winding member extends from an end portion on the side close to the winding shaft 103.

The plurality of winding members have at least one first winding member and at least one second winding member. The first winding member has a wound part that is wound around the winding shaft 103 clockwise, when viewed in the extending direction of the winding shaft 103, from the side far from the winding shaft 103 toward the side close to the winding shaft 103. The second winding member has a wound part that is wound around the winding shaft 103 counterclockwise from the side far from the winding shaft 103 toward the side close to the winding shaft 103. In the present embodiment, the first primary winding 201 and the third primary winding 203 are the first winding members and the second primary winding 202 and the fourth primary winding 204 are the second winding members. In the wiring configuration diagram, each first winding member is referred to as backward winding, and each second winding member is referred to as forward winding.

A winding unit is composed of one first winding member and one second winding member. End portions on the side close to the winding shaft 103 of the first winding member and the second winding member in the winding unit are mutually connected, and the respective extending members extend from end portions on the side far from the winding shaft 103 of the first winding member and the second winding member. In the present embodiment, a winding unit 30 is composed of the first primary winding 201 and the second primary winding 202 and a winding unit 31 is composed of the third primary winding 203 and the fourth primary winding 204.

The first primary winding 201 is wound around the winding shaft 103 by three turns, and a winding end portion 2011 being the extending member on the side close to the winding shaft 103 has a bent structure toward the direction of the second primary winding 202. The second primary winding 202 is wound around the winding shaft 103 by three turns, and a winding end portion 2021 being the extending member on the side close to the winding shaft 103 has a bent structure toward the direction of the first primary winding 201. A configuration in which either one of the winding end portions 2011, 2021 has the bent structure and the other one of the winding end portions 2011, 2021 does not have the bent structure may be adopted. In the present embodiment, as shown in FIG. 9, only the winding end portion 2011 has the bent structure. The winding end portion 2011 and the winding end portion 2021 are connected in series by welding, for example, whereby the winding unit 30 is formed.

The third primary winding 203 is wound around the winding shaft 103 by three turns, and a winding end portion 2031 being the extending member on the side close to the winding shaft 103 has a bent structure toward the direction of the fourth primary winding 204. The fourth primary winding 204 is wound around the winding shaft 103 by three turns, and a winding end portion 2041 being the extending member on the side close to the winding shaft 103 has a bent structure toward the direction of the third primary winding 203. A configuration in which either one of the winding end portions 2031, 2041 has the bent structure and the other does not have the bent structure may be adopted. In the present embodiment, as shown in FIG. 9, only the winding end portion 2031 has the bent structure. The winding end portion 2031 and the winding end portion 2041 are connected in series by welding, for example, whereby the winding unit 31 is formed.

As shown in FIG. 4, the transformer 3 has a plurality of the winding units 30, 31. The plurality of the winding units 30, 31 have the same winding direction with each other. In the present embodiment, the numbers of winding turns of the respective winding units 30, 31 are the same, i.e., 6. The numbers of winding turns of the respective winding units 30, 31 need not necessarily be the same, and the numbers of winding turns may be different. The extending members on the side far from the winding shaft 103 of the first primary winding 201, the second primary winding 202, the third primary winding 203, and the fourth primary winding 204 are winding end portions 2012, 2022, 2032, 2042. The first connection portion 40*a* mutually connects the winding end portions 2012, 2022, 2032, 2042 of the plurality of the winding units 30, 31 in series or in parallel. When the first connection portion 40*a* connects the winding end portions 2012, 2022, 2032, 2042 of the winding units 30, 31 in series, the transformer 3 has 12 turns. When the first connection portion 40*a* connects the extending members of the winding units 30, 31 in parallel, the transformer 3 has 6 turns. In this manner, in the first connection portion 40*a*, the number of turns in the transformer is set.

<First Connection Portion 40*a*>

The first connection portion 40*a* being a main part of the present disclosure is described. The first connection portion 40*a* being the part surrounded by a broken line in FIG. 4 is made from metal, such as copper, in a shape of a plate. The first connection portion 40*a* and one of the two extending members of any of the plurality of division windings of the at least one divided winding are integrated with each other. In the present embodiment, the first connection portion 40*a* is integrated with the winding end portion 2042 being an extending member of the fourth primary winding 204. When the winding end portion 2042 being an extending member of the fourth primary winding 204, and the first connection portion 40*a* are provided in an integrated manner, a step of connecting the winding end portion 2042 and the first connection portion 40*a* is not required, and thus, productivity of the transformer 3 can be improved. The division winding that is integrated with the first connection portion 40*a* is not limited to the fourth primary winding 204, and may be another primary winding. The first connection portion 40*a* need not necessarily be integrated with a division winding, and may be provided as a separate body from the division winding.

As shown in FIG. 6, the first connection portion 40*a* has: through-holes 41, 42, 43 to which the respective winding end portions are connected; mutual connection parts 411, 421, 431 which mutually connect the winding end portions; and external connection parts 4111, 4211 to be connected to the outside. As shown in FIG. 7, parts of the external connection parts 4111, 4211 and parts of the mutual connection parts 411, 421, 431 are exposed from the resin member 301. Each of the mutual connection parts 411, 421, 431 is a part that becomes an insulation interval when the part is cut. A part of any of the mutual connection parts 411, 421, 431 is cut, whereby a plurality of first conductive parts arranged with an insulation interval therebetween are formed from the first connection portion 40*a*. Since a part of the mutual connection part 411, 421, 431 is exposed from the resin member 301, the part of the mutual connection part 411, 421, 431 can be easily cut. The mutual connection part 411, 421, 431 need not necessarily be configured such that a part thereof is exposed from the resin member 301, and the entirety of the mutual connection part 411, 421, 431 may be exposed from the resin member 301. A configuration in which a part of any of the mutual connection parts 411, 421, 431 is cut is shown in FIG. 11 and FIG. 13. In FIG. 11, three first conductive parts are formed. In FIG. 13, two first conductive parts are formed. Since parts of the external connection parts 4111, 4211 are exposed from the resin member 301, the external connection parts 4111, 4211 and the outside are easily connected.

As shown in FIG. 8, the winding end portion 2022 is connected to the through-hole 41, the winding end portion 2032 is connected to the through-hole 42, and the winding end portion 2012 is connected to the through-hole 43. The winding end portions 2012, 2022, 2032 are respectively passed through the through-holes 43, 41, 42, and connected by solder (not shown), for example. As shown in FIG. 4, the winding end portions 2012, 2022, 2032 have bent structures 2013, 2023, 2033 toward the Z-direction, so as to be connected to the first connection portion 40*a*. Since the winding end portions are configured to be connected at the through-holes, the connection configuration at the first connection portion 40*a* is simplified, and thus, productivity of the transformer 3 can be improved.

The division winding that has the extending member integrated with the first connection portion 40*a* is disposed on the outermost side among the stacked winding members, when viewed in the extending direction of the winding shaft 103. In the present embodiment, the fourth primary winding 204 having the winding end portion 2042 integrated with the first connection portion 40*a* is disposed on the outermost side, when viewed in the extending direction of the winding shaft 103. With this configuration, the bending directions of the bent structures 2013, 2023, 2033 can be made uniform. Thus, connection of the winding end portions 2012, 2022, 2032 to the first connection portion 40*a* can be easily performed in one direction. The winding end portion that is integrated with the first connection portion 40*a* may be the winding end portion 2012. In this case, the first primary winding 201 having the winding end portion 2012 is disposed on the outermost side, when viewed in the extending direction of the winding shaft 103.

A case where the first connection portion 40*a* connects the winding end portions 2012, 2022, 2032, 2042 of the winding units 30, 31 in series to form 12 turns is described. When 12 turns are to be formed, parts of the mutual connection parts 411, 431 are removed through tie bar cutting, for example. The mutual connection parts 411, 431 become insulation intervals 451, 471, whereby three first conductive parts are formed as shown in FIG. 11. The three first conductive parts are formed in a state of being cut at the insulation intervals 451, 471. When a plurality of first conductive parts are formed as a result of the insulation intervals 451, 471 being cut, the plurality of first conductive parts can be easily formed. Since the plurality of first conductive parts can be easily formed, productivity of the transformer 3 can be improved.

When the first connection portion 40*a* has three or more first conductive parts, each of two specific first conductive parts is an external connection part, or is an external connection part and is a mutual connection part, and each of one or more non-specific first conductive parts other than the two specific first conductive parts is a mutual connection part. In the present embodiment, in FIG. 11, the first conductive parts on both sides are the two specific first conductive parts and are the external connection parts 4111,

4211. The center first conductive part is a non-specific first conductive part and is the mutual connection part 421. As shown in FIG. 10, the winding unit 30 and the winding unit 31 are connected in series at the mutual connection part 421, and thus, the transformer 3 in which the number of primary turns N1 is 12 can be realized.

A case where the first connection portion 40*a* connects the winding end portions 2012, 2022, 2032, 2042 of the winding units 30, 31 in parallel to form 6 turns is described. When 6 turns are to be formed, a part of the mutual connection part 421 is removed through tie bar cutting, for example. The mutual connection part 421 becomes an insulation interval 461, whereby two first conductive parts are formed as shown in FIG. 13. The two first conductive parts are formed in a state of being cut at the insulation interval 461.

When the first connection portion 40*a* has two first conductive parts, each of the two first conductive parts is an external connection part to be connected to the outside and is a mutual connection part which mutually connects two or more extending members. In the present embodiment, in FIG. 13, the two first conductive parts are the external connection parts 4111, 4211 and the mutual connection parts 411, 431. As shown in FIG. 12, the winding unit 30 and the winding unit 31 are connected in parallel at the mutual connection parts 411, 431, and thus, the transformer 3 in which the number of primary turns N1 is 6 can be realized.

In a transformer 3 in which the number of turns N1 of the primary winding 3*a* is 6, when compared with a transformer 3 in which the number of turns N1 of the primary winding 3*a* is 12, the number of turns of the primary winding 3*a* is halved, and thus, current in a doubled amount flows in the primary winding 3*a*. However, since the primary winding 3*a* is realized by parallel connection of the winding unit 30 and the winding unit 31, current that flows in each of the first primary winding 201, the second primary winding 202, the third primary winding 203, and the fourth primary winding 204 is the same as that in the case where the number of turns N1 is 12. That is, even when current that flows on the primary side of the transformer 3 has changed due to change in the number of turns N1, the amount of current that flows in each of the first primary winding 201, the second primary winding 202, the third primary winding 203, and the fourth primary winding 204 is the same. Therefore, it is not necessary to perform redesigning, such as changing the winding width or reconsidering the cooling method in order to cause the heat generation amount of the primary winding 3*a* to be in a range that allows the transformer to be operable. This is particularly effective when the cooling conditions of the first primary winding 201, the second primary winding 202, the third primary winding 203, and the fourth primary winding 204 are substantially the same, such as when natural heat dissipation is allowed, or cooling is performed from both surfaces of the first primary winding 201 and the fourth primary winding 204 which are the outermost layers of the primary winding 3*a*.

In the first connection portion 40*a* having a plurality of first conductive parts arranged with an insulation interval therebetween, when series connection and parallel connection of the winding units 30, 31 are switched, the number of turns N1 of the primary winding 3*a* can be switched between 6 and 12 while the core portion and the wound parts of the division windings of the transformer 3 are used in common without being changed. Therefore, since various input voltage specifications can be easily coped with, there is no need to redesign the core portion and the winding members of the transformer 3, and thus, the same kinds of materials forming the transformer 3 can be used in common. Since the same kinds of materials forming the transformer 3 are used in common, increase in the number of design steps when the number of turns has been changed and in the kinds of the transformer 3 due to dedicated design is suppressed, and production management during manufacture of the transformer 3 and inventory management thereof are facilitated. Therefore, productivity of the transformer 3 can be improved. Switching between series connection and parallel connection of the winding units 30, 31 can be performed at the first connection portion 40*a*. Thus, there is no need to prepare and replace dedicated members according to each connection in order to change the connection, and production management during manufacture and inventory management can be easily performed.

When the transformer 3 shown in the present embodiment is used in the power conversion device 100, a power conversion device 100 that can easily cope with various input voltage specifications and that has improved productivity can be obtained. In the present embodiment, the transformer 3 is a planar-type transformer. Since the transformer 3 is a planar-type transformer, division windings can be easily provided by being stacked. As a result of stacking the division windings in the extending direction of the winding shaft 103, a plurality of extending members can be provided, and thus, a greater number of connection patterns can be configured at the first connection portion 40*a*. Due to the stacking, in particular, the extending members that are closer to the winding shaft 103 can be disposed in a concentrated manner, and thus, connection between the extending members and connection of the extending members to the first connection portion 40*a* can be easily performed. In addition, when the positions of the extending members are changed, a number of turns (e.g., 2.5 or 3.5) that is not an integer can be easily configured. In addition, the projected area of the transformer 3 can be reduced.

<Modification of First Connection Portion 40*a*>

Figure 14:
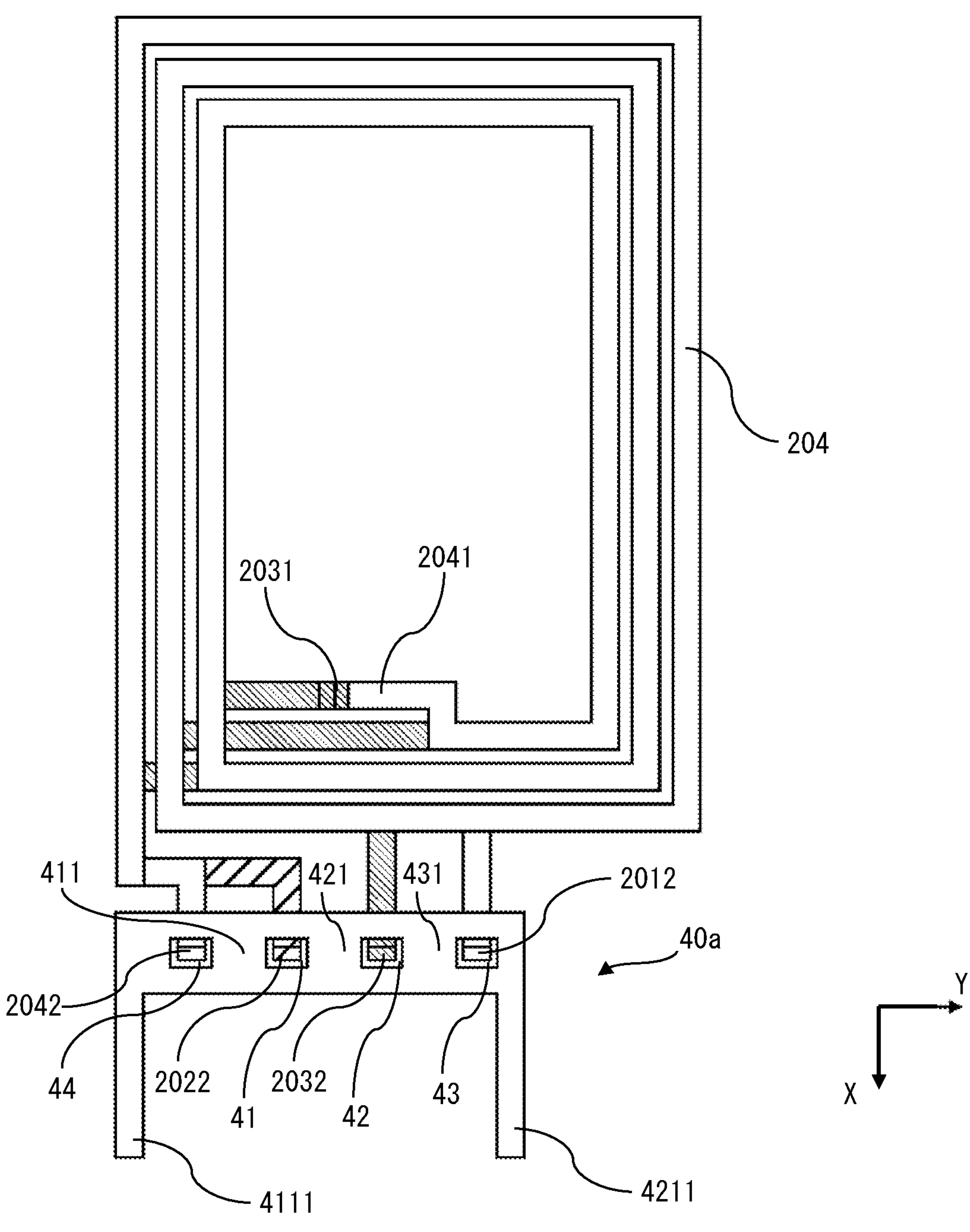
FIG. 14 is a schematic plan view showing the primary winding and the first connection portion of another transformer according to the first embodiment.
Figure 15:
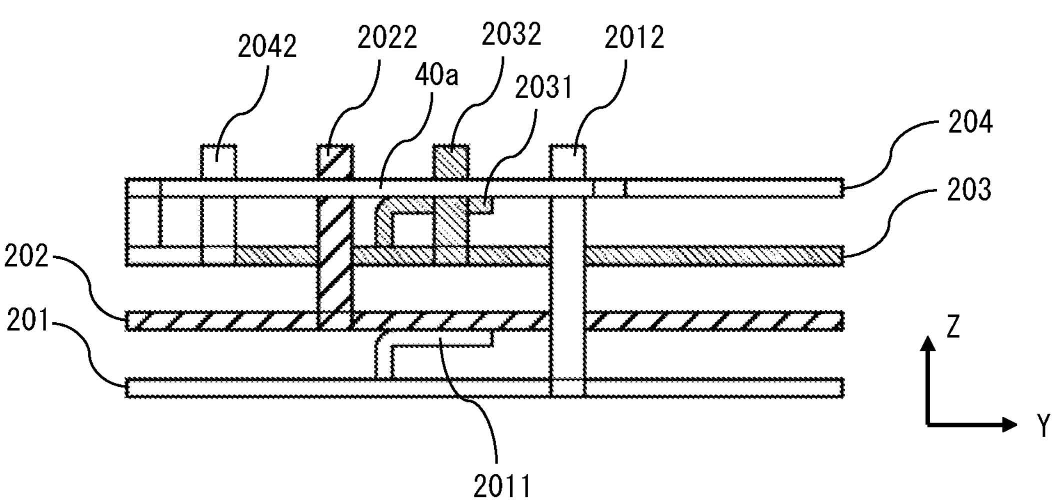
FIG. 15 is a schematic side view showing the primary winding and the first connection portion of another transformer according to the first embodiment.
Figure 16:
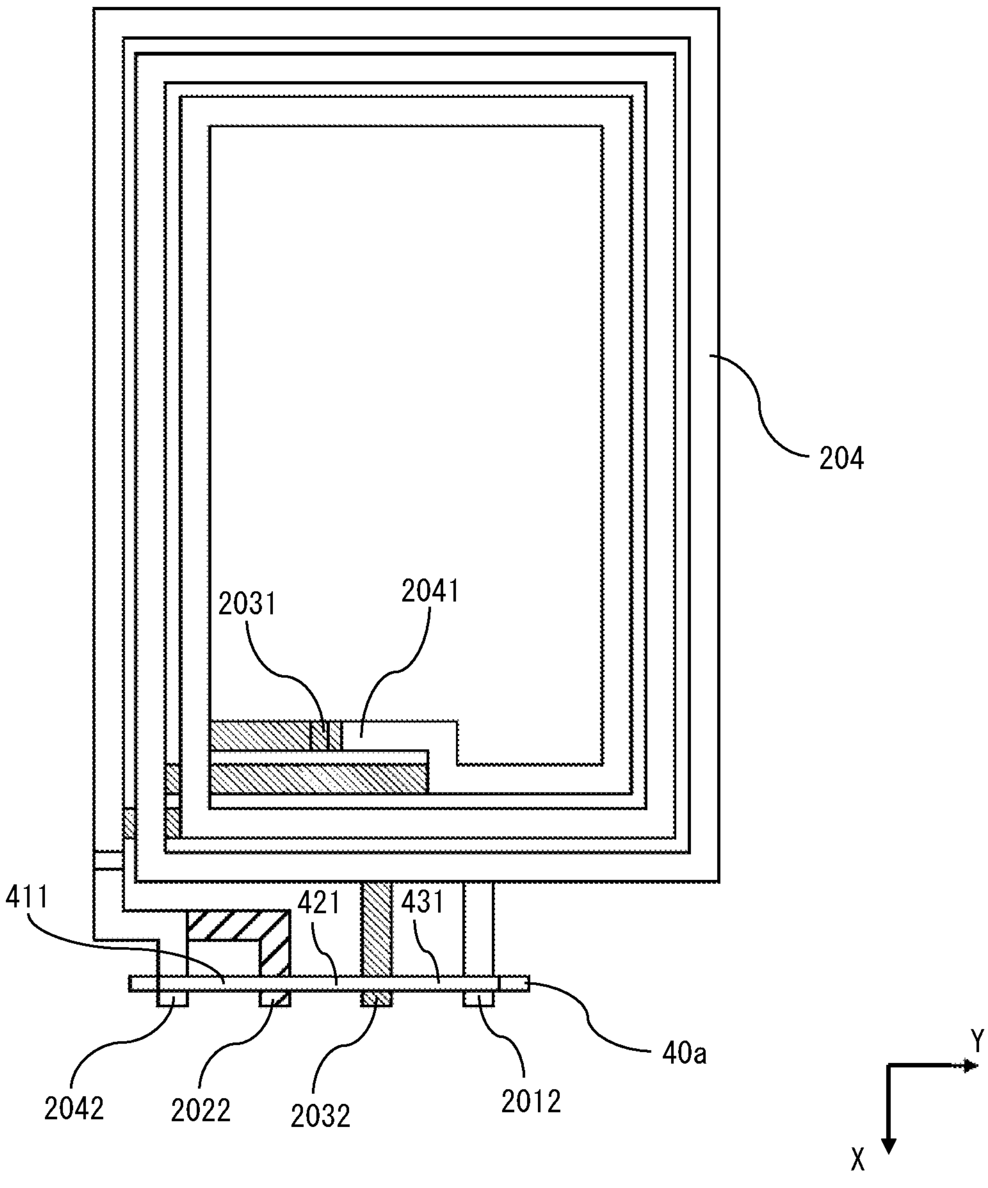
FIG. 16 is a schematic plan view showing the primary winding and the first connection portion of another transformer according to the first embodiment.
Figure 17:
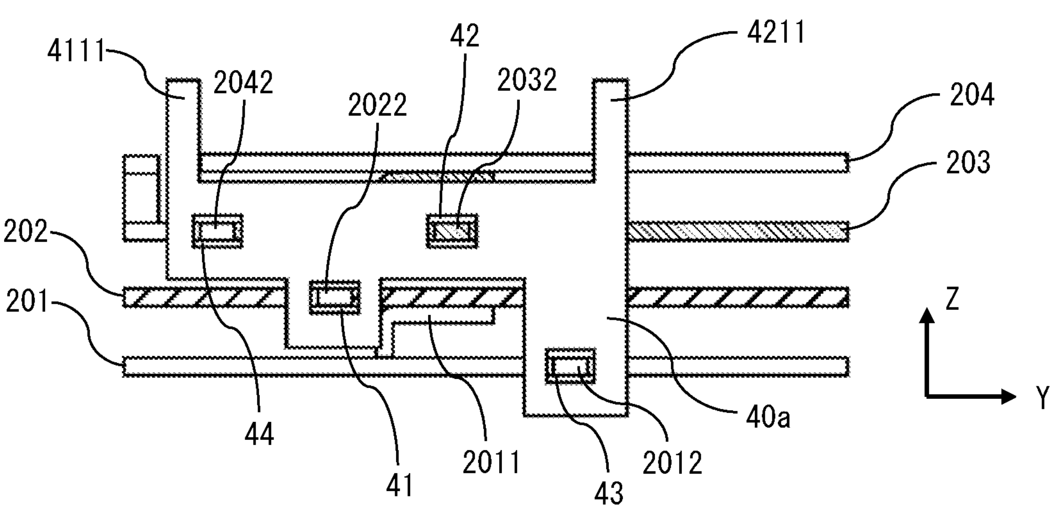
FIG. 17 is a schematic side view showing the primary winding and the first connection portion of another transformer according to the first embodiment.

In FIG. 4, an example in which the first connection portion 40*a* is integrated with the winding end portion 2042 has been shown. However, the first connection portion 40*a* need not necessarily be integrated with a division winding. A first connection portion 40*a*, being a modification of the first connection portion 40*a*, that is provided as a separate body from a division winding is described. FIG. 14 is a schematic plan view showing the primary winding 3*a* and the first connection portion 40*a* of another transformer 3 according to the first embodiment. FIG. 15 is a schematic side view showing the primary winding 3*a* and the first connection portion 40*a* of said another transformer 3. FIG. 16 is a schematic plan view showing the primary winding 3*a* and the first connection portion 40*a* of still another transformer 3 according to the first embodiment. FIG. 17 is a schematic side view showing the primary winding 3*a* and the first connection portion 40*a* of said still another transformer 3.

The first connection portion 40*a* of each case is made from a metal, such as copper, in a shape of a plate. The first connection portion 40*a* shown in FIG. 14 and FIG. 15 is disposed in parallel to an x-y plane. The first connection portion 40*a* shown in FIG. 16 and FIG. 17 is disposed in parallel to a y-z plane. Each first connection portion 40*a* has four through-holes 41, 42, 43, 44. As shown in FIG. 14, the winding end portion 2022 is connected to the through-hole 41, the winding end portion 2032 is connected to the through-hole 42, the winding end portion 2012 is connected to the through-hole 43, and the winding end portion 2042 is connected to the through-hole 44. As shown in FIG. 17, the winding end portion 2022 is connected to the through-hole

41, the winding end portion 2032 is connected to the through-hole 42, the winding end portion 2012 is connected to the through-hole 43, and the winding end portion 2042 is connected to the through-hole 44.

Even when the division winding and the first connection portion 40*a* are provided as separate bodies, various input voltage specifications can be easily coped with, and the transformer 3 that has improved productivity can be obtained, similar to the example described above. When the first connection portion 40*a* is provided as a separate body, the degree of freedom of disposition of the first connection portion 40*a* can be improved. In addition, the division winding and the first connection portion 40*a* can be configured by different materials. In a case where the first connection portion 40*a* is formed from a material that has a higher thermal conductivity than the division winding, when the first connection portion 40*a* is thermally connected to a cooler of the power conversion device via a heat dissipation sheet, heat generation at the first connection portion 40*a* can be suppressed.

<Modification of Configuration of Primary Winding 3*a*>

Figure 18:
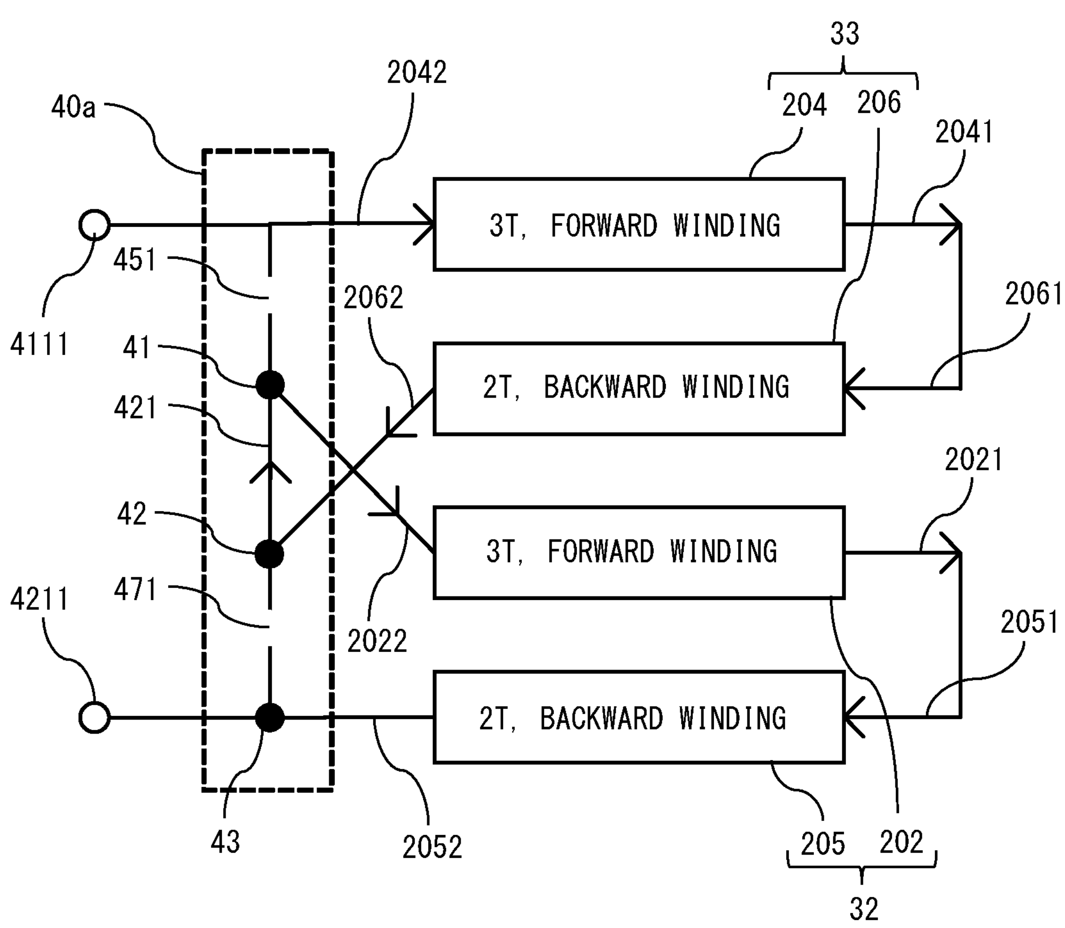
FIG. 18 is a wiring configuration diagram of the primary winding and the first connection portion of another transformer according to the first embodiment.
Figure 19:
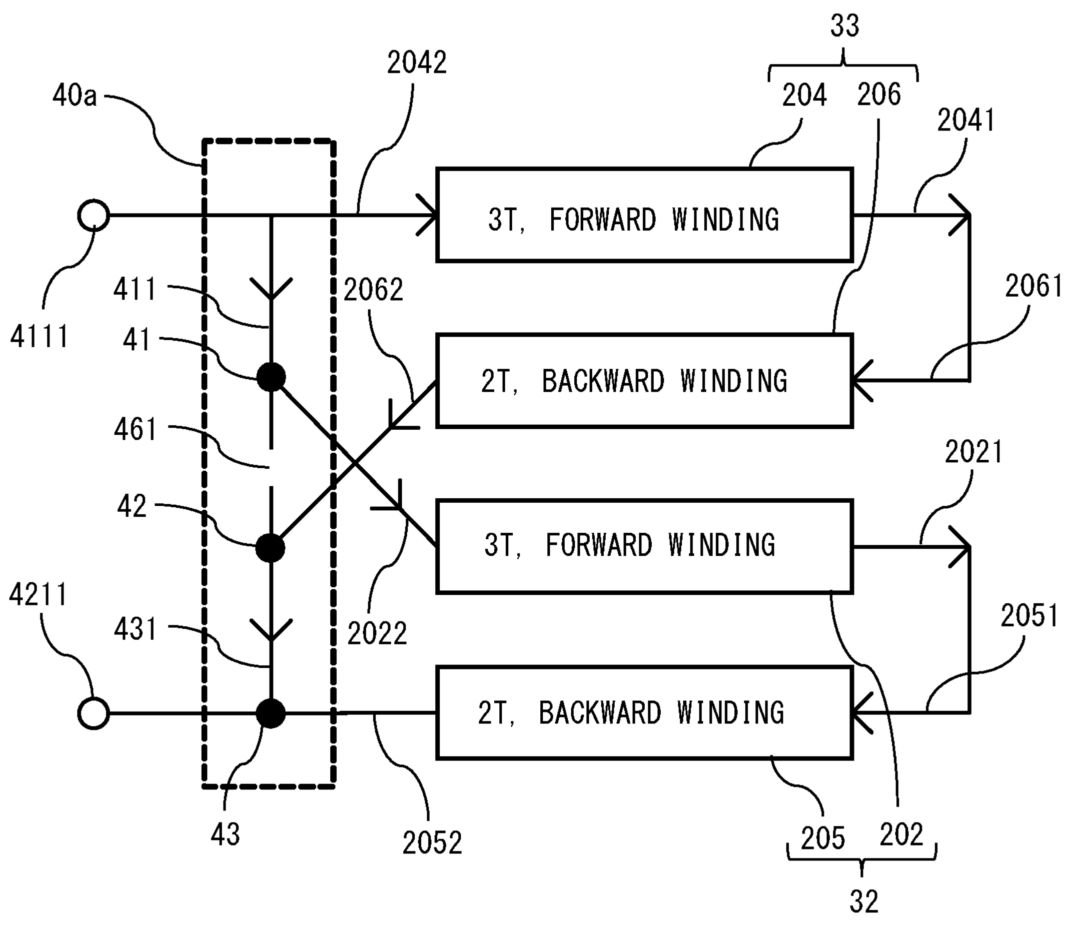
FIG. 19 is another wiring configuration diagram of the primary winding and the first connection portion of another transformer according to the first embodiment.
Figure 20:
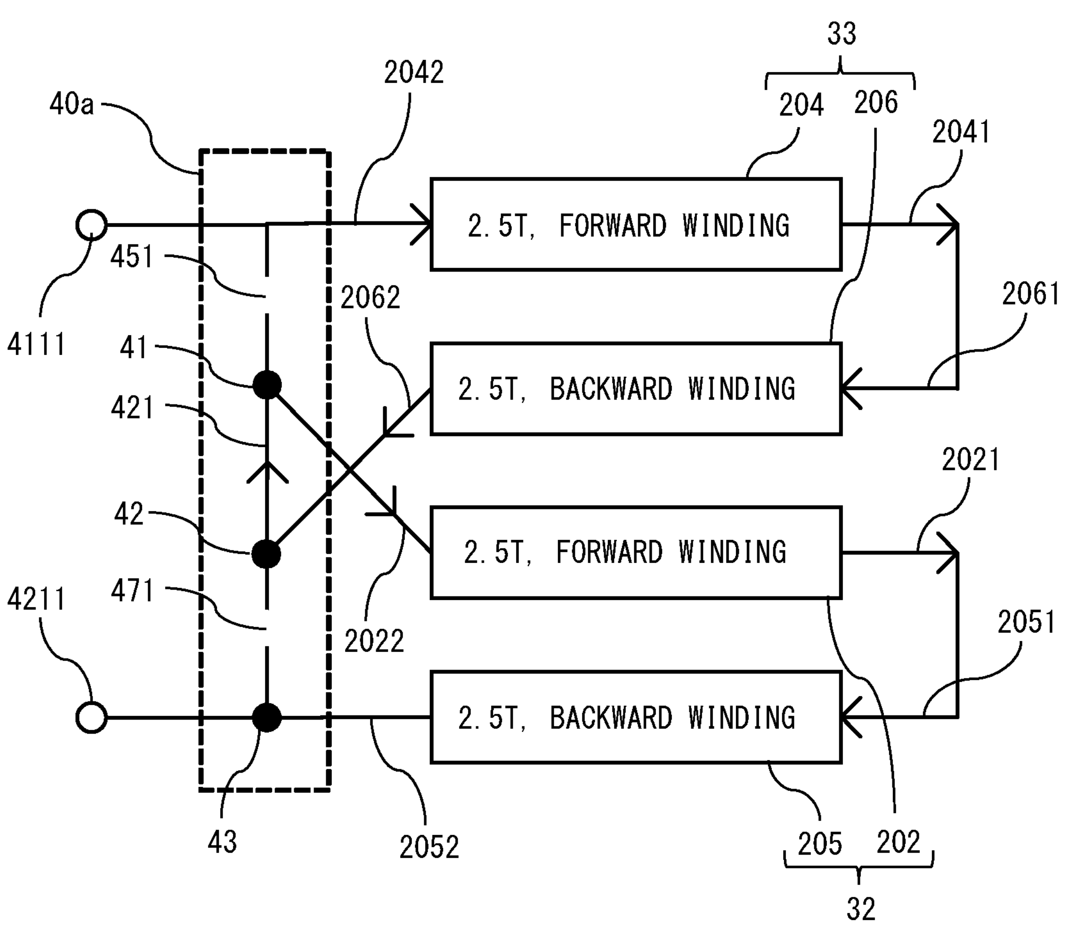
FIG. 20 is a wiring configuration diagram of the primary winding and the first connection portion of another transformer according to the first embodiment.
Figure 21:
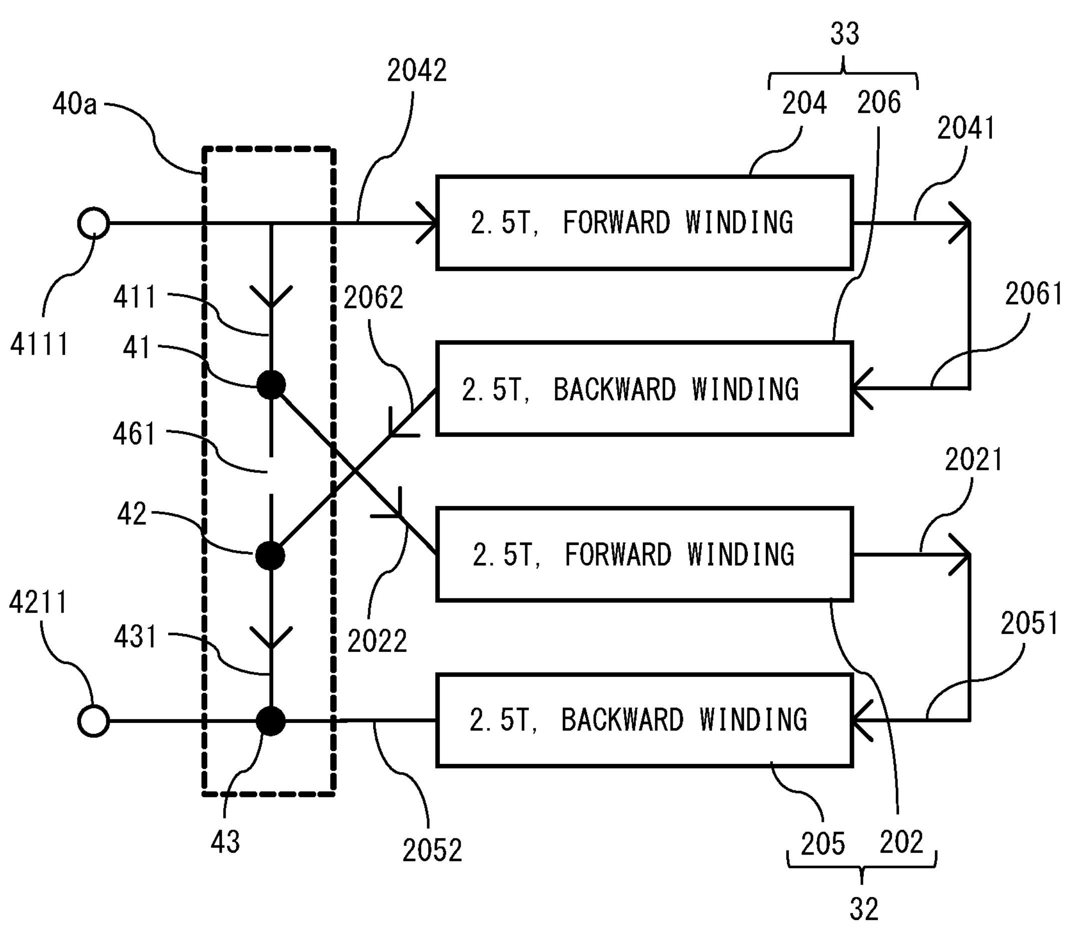
FIG. 21 is another wiring configuration diagram of the primary winding and the first connection portion of another transformer according to the first embodiment.

A modification of the configuration of the primary winding 3*a* is described. FIG. 18 is a wiring configuration diagram of the primary winding 3*a* and the first connection portion 40*a* of another transformer 3 according to the first embodiment. FIG. 19 is another wiring configuration diagram of the primary winding 3*a* and the first connection portion 40*a* of another transformer 3. FIG. 20 is a wiring configuration diagram of the primary winding 3*a* and the first connection portion 40*a* of still another transformer 3 according to the first embodiment. FIG. 21 is another wiring configuration diagram of the primary winding 3*a* and the first connection portion 40*a* of still another transformer 3. In the transformers 3 according to the modification, the number of winding turns of the primary winding 3*a* is different from those in FIG. 10 and FIG. 12. In the modification, the disposition configuration of the primary winding 3*a* is the same as that in FIG. 4, except for the number of winding turns of the primary winding 3*a*.

In the wiring configurations shown in FIG. 10 and FIG. 12, an example in which the number of winding turns of the primary winding 3*a* is changed between 6 and 12 is shown. The number of winding turns of the primary winding 3*a* need not be set to a multiple of 3, with the number of winding turns of each of the division windings of the primary winding 3*a* set to 3. The number of turns of each division winding may be changed. As shown in FIG. 18 and FIG. 19, the number of winding turns of the primary winding 3*a* may be set to 5 or 10, for example.

A first primary winding 205 is wound around the winding shaft 103 by two turns, and a winding end portion 2051 being the extending member on the side close to the winding shaft 103 has a bent structure toward the direction of the second primary winding 202. The second primary winding 202 is wound around the winding shaft 103 by three turns, and the winding end portion 2021 being the extending member on the side close to the winding shaft 103 has a bent structure toward the direction of the first primary winding 205. A configuration in which either one of the winding end portions 2051, 2021 has a bent structure and the other does not have a bent structure may be adopted. The winding end portion 2051 and the winding end portion 2021 are connected in series by welding, for example, whereby a winding unit 32 is formed.

A third primary winding 206 is wound around the winding shaft 103 by two turns, and a winding end portion 2061 being the extending member on the side close to the winding shaft 103 has a bent structure toward the direction of the fourth primary winding 204. The fourth primary winding 204 is wound around the winding shaft 103 by three turns, and the winding end portion 2041 being the extending member on the side close to the winding shaft 103 has a bent structure toward the direction of the third primary winding 206. A configuration in which either one of the winding end portions 2061, 2041 has a bent structure and the other does not have a bent structure may be adopted. The winding end portion 2061 and the winding end portion 2041 are connected in series by welding, for example, whereby a winding unit 33 is formed.

The winding units 32, 33 have the same number of winding turns and the same winding direction with each other. The number of winding turns of each of the winding units 32, 33 in the modification is 5. The extending members on the side far from the winding shaft 103 of the first primary winding 205, the second primary winding 202, the third primary winding 206, and the fourth primary winding 204 are winding end portions 2052, 2022, 2062, 2042. The first connection portion 40*a* mutually connects the winding end portions 2052, 2022, 2062, 2042 of the winding units 32, 33 in series or in parallel.

Parts of the mutual connection parts 411, 431 of the first connection portion 40*a* are removed through tie bar cutting, for example, whereby the mutual connection parts 411, 431 become the insulation intervals 451, 471. The insulation intervals 451, 471 are formed and the first connection portion 40*a* connects the winding end portions 2052, 2022, 2062, 2042 of the winding units 32, 33 in series, whereby the transformer 3 has 10 turns as shown in FIG. 18. A part of the mutual connection part 421 of the first connection portion 40*a* is removed through tie bar cutting, for example, whereby the mutual connection part 421 becomes the insulation interval 461. The insulation interval 461 is formed and the first connection portion 40*a* connects the extending members of the winding units 32, 33 in parallel, whereby the transformer 3 has 5 turns as shown in FIG. 19.

The configuration of the primary winding 3*a* in which the number of winding turns of the primary winding 3*a* is set to 5 or 10 is not limited to the configuration in FIG. 18 or FIG. 19. As shown in FIG. 20 and FIG. 21, even in a case where the number of winding turns of each of the division windings of the primary winding 3*a* is set to 2.5, when the first connection portion 40*a* connects the winding units 32, 33 in series or in parallel, the number of winding turns of the primary winding 3*a* can be set to 5 or 10.

With respect to the wound part of each of the first primary winding 205 and the third primary winding 206, a clearance is provided between windings of each turn, and the winding width is increased such that the outer shapes are aligned with those of the second primary winding 202 and the fourth primary winding 204, when viewed in the extending direction of the center core. With this configuration, when 5 turns are formed in each of the winding units 32, 33, increase in loss in the primary winding 3*a* due to increase in current on the primary side can be suppressed, when compared with a case where 6 turns are formed in each of the winding units 30, 31.

In the first primary winding 205 and the third primary winding 206, the winding end portions 2051, 2061, 2052, 2062 and the parts of the extending members, which are parts other than the wound parts, have the same configurations as those of the corresponding parts of each of the first primary winding 201 and the third primary winding 203. Therefore, the number of turns can be changed by merely changing the winding members without changing the outer shape of and connection in the transformer 3. In this example, change from 3 turns to 2 turns has been described. However, when winding members that each have one or more turns and in which parts other than the wound parts have the same structures are prepared, and winding members are selected, any number of primary turns N1 can be coped with.

<Product Group of Transformer 3>

A transformer product group including a plurality of models of transformers 3 is described. Each of the plurality of models of transformers 3 includes: a core portion for forming a magnetic circuit; a primary winding and a secondary winding wound at the core portion; and a first connection portion having a plurality of first conductive parts arranged with an insulation interval therebetween. One or both of the primary winding and the secondary winding are divided into a plurality of division windings. Each of the plurality of division windings of the at least one divided winding includes a wound part wound at the core portion, and two extending members extending from both ends of the wound part.

The first connection portion is connected to one of the two extending members of each of the plurality of division windings of the at least one divided winding. The part, of the first connection portion, connected to one of the two extending members of each of the plurality of division windings is defined as a connected portion. The plurality of connected portions are arranged with a disposition interval therebetween. The insulation interval is provided at the part of the disposition interval. The part of the disposition interval in which the insulation interval is provided is different among the models of transformers 3, and a first conductive part is present in the part of the disposition interval in which the insulation interval is not provided. With this configuration, a plurality of models of transformers 3 having different connection configurations at the first connection portion can be easily managed as a product group. Since production management during manufacture of the transformers 3 and inventory management thereof are facilitated, productivity of the transformers 3 can be improved.

An example of a model configuration at the first connection portion is described. When the first connection portion has two first conductive parts, each of the two first conductive parts is an external connection part to be connected to the outside and is a mutual connection part which mutually connects two or more extending members. This model configuration is the configuration shown in FIG. 13, for example, and the transformer 3 is of a model in which the winding units 30, 31 are connected in parallel. When the first connection portion has three or more first conductive parts, each of two specific first conductive parts is an external connection part, or is an external connection part and is a mutual connection part, and each of one or more non-specific first conductive parts other than the two specific first conductive parts is a mutual connection part. This model configuration is the configuration shown in FIG. 11, for example, and the transformer 3 is of a model in which the winding units 30, 31 are connected in series. With this configuration, a plurality of models of transformers 3 in each of which the winding units 30, 31 are connected in parallel or in series can be easily managed as a product group.

<Manufacturing Method for Transformer 3>

Figure 22:
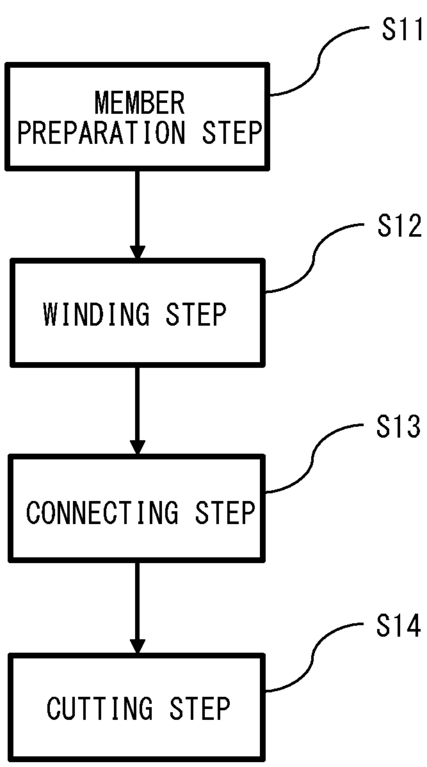
FIG. 22 shows a manufacturing process of the transformer according to the first embodiment.

A manufacturing method for the transformer 3 is described with reference to FIG. 22. FIG. 22 shows a manufacturing process of the transformer 3. The transformer 3 is manufactured through a member preparation step (S11), a winding step (S12), a connecting step (S13), and a cutting step (S14). The member preparation step is a step of preparing the lower core 101 and the upper core 102 being the core portion for forming a magnetic circuit, the primary winding and the secondary winding, and a first connection member to be the first connection portion 40*a*. The winding step is a step of winding the primary winding and the secondary winding at the core portion. The connecting step is a step of connecting one or both of the primary winding and the secondary winding to the first connection member. The cutting step is a step of cutting the first connection member. In the following, details are described.

In the member preparation step, a primary winding and a secondary winding in which one or both of the primary winding and the secondary winding are divided into a plurality of division windings, and each of the plurality of division windings of the at least one divided winding has a wound part wound at a core portion, and two extending members extending from both ends of the wound part, are prepared as the primary winding and the secondary winding. When the transformer 3 is a planar-type transformer, the winding step is a step of disposing winding members of the primary winding and the secondary winding at the core portion.

In the connecting step, one of the two extending members of each of the plurality of division windings of the at least one divided winding is connected, with a disposition interval therebetween, to the first connection member. In the cutting step, the part of a different disposition interval, out of the plurality of disposition intervals, is cut in accordance with the model of the transformer. When the transformer 3 is manufactured in this manner, the model of the transformer can be easily changed by cutting a different disposition interval in the first connection member in the cutting step. Therefore, a plurality of models of transformers 3 can be easily manufactured. Since a plurality of models of transformers 3 can be easily manufactured, productivity of the plurality of models of transformers 3 can be improved.

An example of model change realized through a cutting step in which the cutting place is changed in accordance with the model of the transformer is described. When the first connection member is cut into two pieces to form two conductive parts, cutting is performed such that each of the two conductive parts is an external connection part to be connected to the outside and is a mutual connection part which mutually connects two or more extending members. This model configuration is the configuration shown in FIG. 13, for example, and the transformer 3 is of a model in which the winding units 30, 31 are connected in parallel. When the first connection member is cut into three or more pieces to form three or more conductive parts, cutting is performed such that each of two specific conductive parts is an external connection part, or is an external connection part and is a mutual connection part, and each of one or more non-specific conductive parts other than the two specific conductive parts is a mutual connection part. This model configuration is the configuration shown in FIG. 11, for example, and the transformer 3 is of a model in which the winding units 30, 31 are connected in series. When cutting is performed as above, a plurality of models of transformers 3 in each of which the winding units 30, 31 are connected in parallel or in series can be easily manufactured.

In the present embodiment, the winding end portions 2011, 2021, 2031, 2041 each being the other of the two extending members are mutually connected. However, the configuration of connecting the winding end portions 2011, 2021, 2031, 2041 is not limited thereto. On the winding end portions 2011, 2021, 2031, 2041 side as well, a connection portion may be provided, and the winding end portions 2011, 2021, 2031, 2041 may be mutually connected.

As described above, in the transformer 3 according to the first embodiment, one or both of a primary winding and a secondary winding are divided into a plurality of division windings, and each of the plurality of division windings of the at least one divided winding has a wound part wound at a core portion, and two extending members extending from both ends of the wound part; a first connection portion is connected to one of the two extending members of each of the plurality of division windings of the at least one divided winding; when the first connection portion 40*a* has two first conductive parts, each of the two first conductive parts is an external connection part and is a mutual connection part which mutually connects two or more extending members; and when the first connection portion 40*a* has three or more first conductive parts, each of two specific first conductive parts is an external connection part, or is an external connection part and is a mutual connection part, and each of one or more non-specific first conductive parts other than the two specific first conductive parts is a mutual connection part. Therefore, series connection and parallel connection of the division windings can be switched by connection of the extending members at the first connection portion 40*a*, and the number of turns of the transformer 3 can be changed while the core portion and the wound parts are used in common without being changed.

Therefore, since various input voltage specifications can be easily coped with, there is no need to redesign the core portion and the division windings, and thus, the same kinds of materials forming the transformer 3 can be used in common. Since the same kinds of materials forming the transformer 3 are used in common, increase in the number of design steps when the number of turns has been changed and in the kinds of the transformer 3 due to dedicated design is suppressed, and production management during manufacture of the transformer 3 and inventory management thereof are facilitated. Therefore, productivity of the transformer 3 can be improved. In addition, at the first connection portion 40*a*, series connection and parallel connection of the division windings can be easily switched.

When a plurality of first conductive parts are formed in a state of being cut at the insulation interval, the plurality of first conductive parts can be easily formed. Since the plurality of first conductive parts can be easily formed, productivity of the transformer 3 can be improved. When the other of the two extending members of each of the plurality of division windings of the at least one divided winding is mutually connected, extending members extending on the outer side relative to the wound part of each of the plurality of division windings can be reduced. Therefore, the configuration of the extending member can be simplified.

When the transformer 3 is a planar-type transformer, and the plurality of winding members are stacked in the extending direction of the winding shaft 103, a plurality of extending members can be provided, and thus, a greater number of connection patterns can be configured at the first connection portion 40*a*. When one of the two extending members of each of the plurality of division windings of the at least one divided winding extends from an end portion on the side far from the winding shaft 103, and the other of the two extending members of each of the plurality of division windings of the at least one divided winding extends from an end portion on the side close to the winding shaft 103, the first connection portion 40*a* can be disposed at a place away from the winding shaft 103 on the outer side with respect to the wound part, and thus, cutting at the cutting place in the first connection portion 40*a* is facilitated. Therefore, the number of turns of the primary winding 3*a* can be easily changed.

When the first connection portion 40*a* is formed from a metal in a shape of a plate, and the first connection portion 40*a* and one of the two extending members of any of the plurality of division windings of the at least one divided winding are integrated with each other, a step of connecting the first connection portion 40*a* to the extending member to be integrated with the first connection portion 40*a* is not required. Therefore, productivity of the transformer 3 can be improved. When the division winding that has the extending member integrated with the first connection portion 40*a* is disposed on the outermost side among the stacked winding members, when viewed in the extending direction of the winding shaft 103, the bending direction of the bent structures 2013, 2023, 2033 of the extending members of the winding members can be made uniform. Thus, connection of the winding end portions 2012, 2022, 2032 and the first connection portion 40*a* can be easily performed in one direction.

When the plurality of winding members have at least one first winding member that has a wound part that is wound around the winding shaft 103 clockwise, when viewed in the extending direction of the winding shaft 103, and at least one second winding member that has a wound part that is wound around the winding shaft 103 counterclockwise, windings having the same winding direction with respect to the winding shaft 103 can be easily configured by connecting one first winding member and one second winding member in series. When the transformer includes a winding unit composed of a first winding member and a second winding member, end portions on the side close to the winding shaft 103 of the first winding member and the second winding member in the winding unit are mutually connected, and the respective extending members extend from end portions on the side far from the winding shaft 103 of the first winding member and the second winding member, the first connection portion 40*a* can be easily disposed at a place away from the winding shaft 103 on the outer side with respect to the wound part, in the configuration in which the winding unit is provided.

When the transformer 3 includes a plurality of winding units, the plurality of winding units have the same number of winding turns and the same winding direction, and the first connection portion 40*a* mutually connects the extending members of the plurality of winding units in series or in parallel, series or parallel connection of the provided plurality of winding units can be easily changed by the first connection portion 40*a*. Therefore, the number of turns of the transformer 3 can be easily changed. In a case where a winding, out of the primary winding and the secondary winding, that has a greater number of turns of the wound part is the plurality of division windings of the at least one divided winding, when the first connection portion 40*a* is provided to the winding that has the greater number of turns, thereby enabling changing of the number of turns, a greater number of connection patterns of the extending member can be configured. In addition, a turn ratio that is required as a transformer can be easily adjusted with respect to the number of turns of the other winding.

In a case where a part or the entirety of the primary winding and the secondary winding is sealed by the resin member 301, since the spaces between the windings and the outer peripheral part of each winding are covered by the resin member 301, insulation performance of each winding can be ensured. When a part of the mutual connection part is exposed from the resin member 301, the part of the mutual connection part can be easily cut. In a case where the transformer 3 includes the cooler 302, the resin member 301 has the exposure portion 301*a*, and one or both of the primary winding 3*a* and the secondary winding 3*b*, 3*c* are thermally connected, at the exposure portion 301*a*, to the cooler 302 via the heat transfer member 303, heat generation of the transformer 3 can be suppressed. In a case where the power conversion device 100 includes: a plurality of the semiconductor switching element 2*a*, 2*b*, 2*c*, 2*d* which are connected to a DC power supply and which convert inputted DC power to AC power and output the AC power; the transformer 3, described in the present embodiment, which converts voltage of the AC power outputted from the plurality of the semiconductor switching element 2*a*, 2*b*, 2*c*, 2*d* and outputs the resultant voltage; and the rectification circuit 4 which rectifies output of the transformer 3, the power conversion device 100 that can easily cope with various input voltage specifications and that has improved productivity can be obtained.

Second Embodiment

Figure 23:
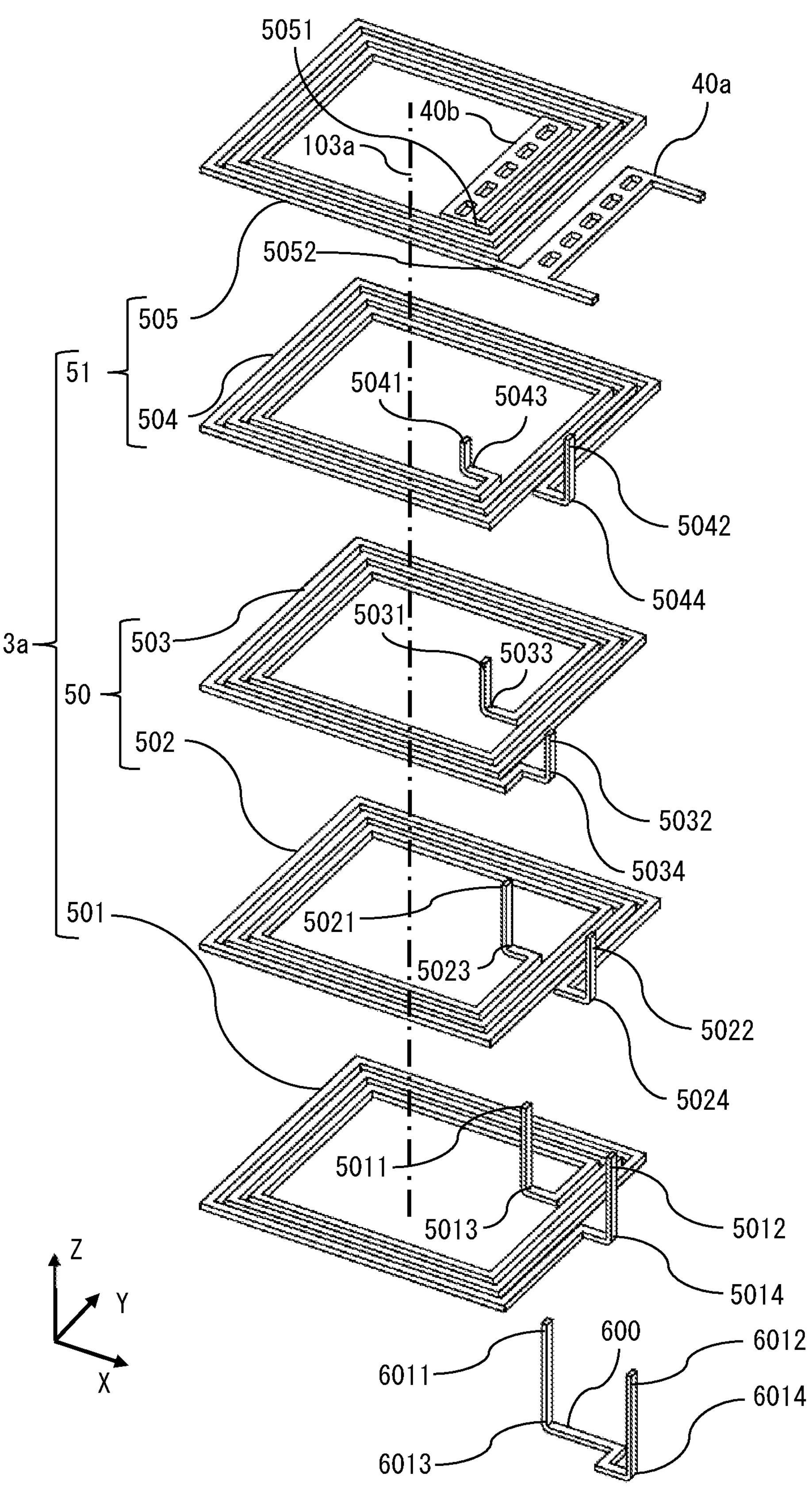
FIG. 23 is a schematic exploded perspective view showing a primary winding, a first connection portion, and a second connection portion of the transformer according to a second embodiment.
Figure 24:
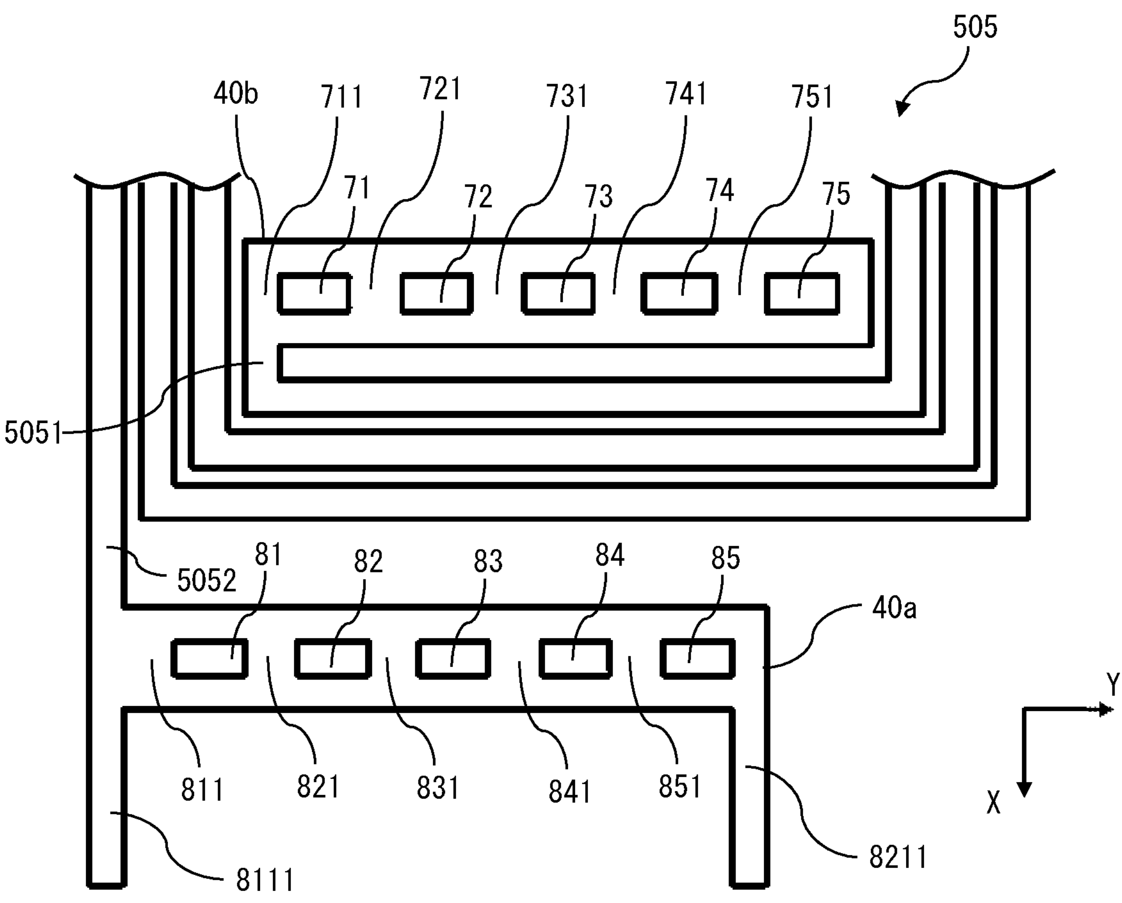
FIG. 24 is a schematic plan view showing the first connection portion and the second connection portion of the transformer according to the second embodiment.
Figure 25:
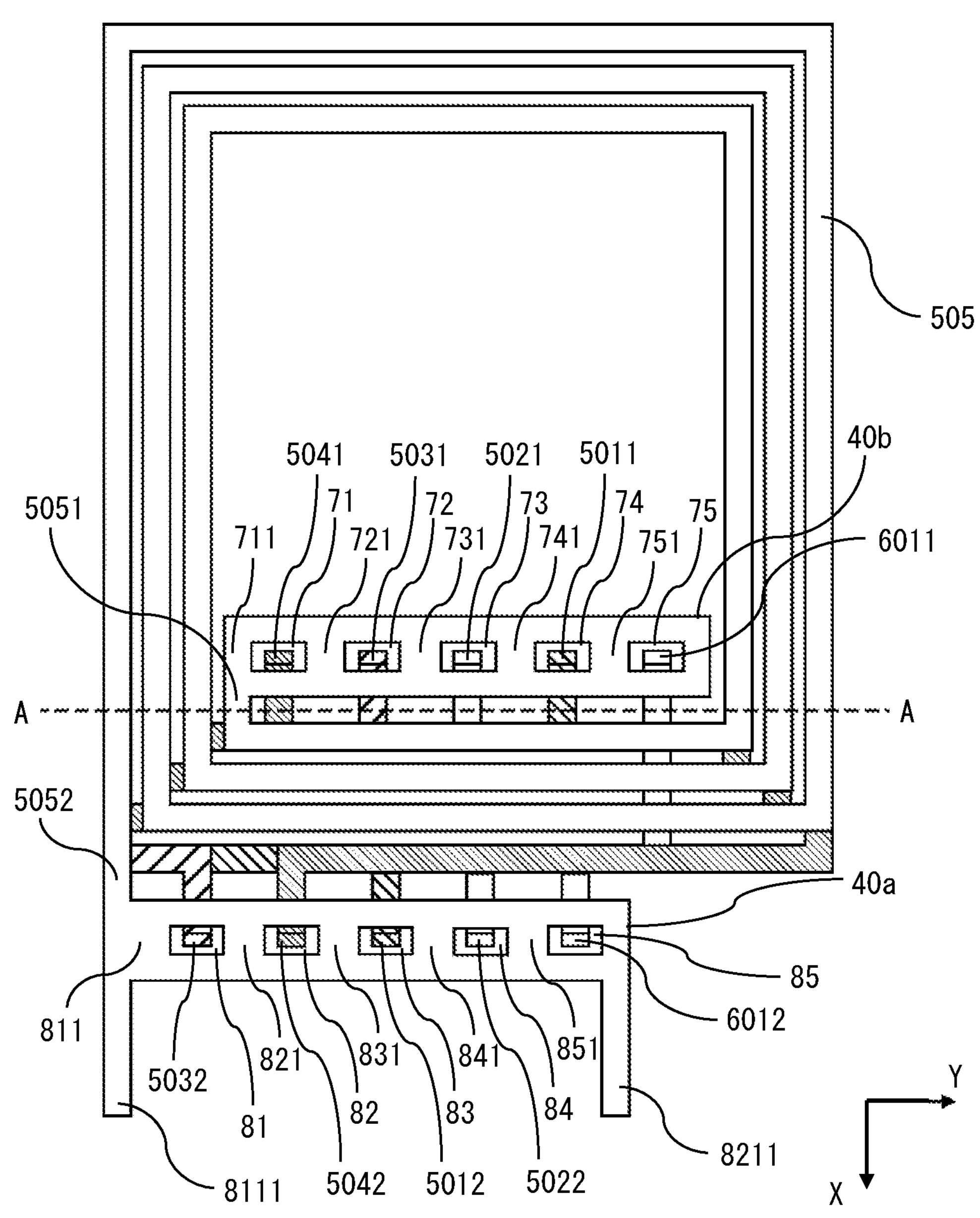
FIG. 25 is a schematic plan view showing the primary winding, the first connection portion, and the second connection portion of the transformer according to the second embodiment.
Figure 26:
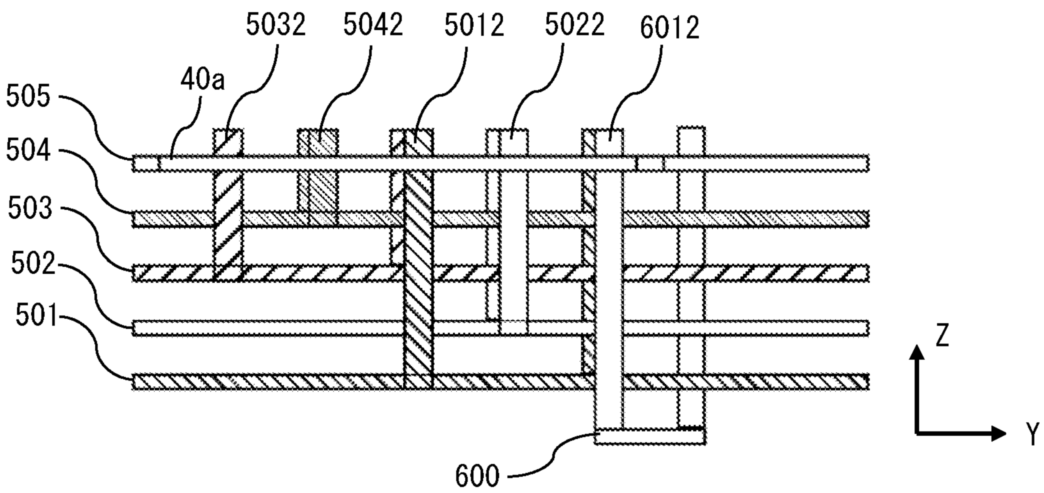
FIG. 26 is a schematic side view showing the primary winding and the first connection portion of the transformer according to the second embodiment.
Figure 27:
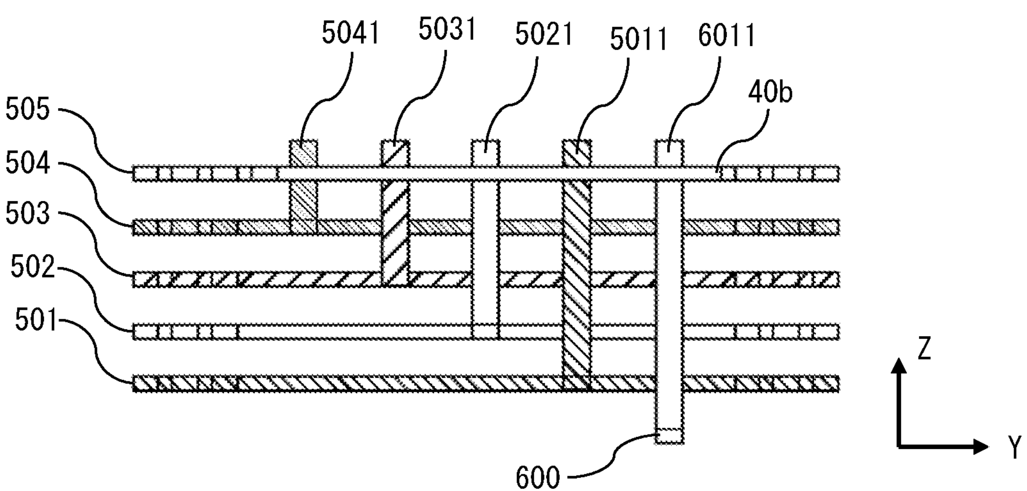
FIG. 27 is a cross-sectional view of the primary winding of the transformer, cut at the position of an A-A cross-section in FIG. 25.
Figure 28:
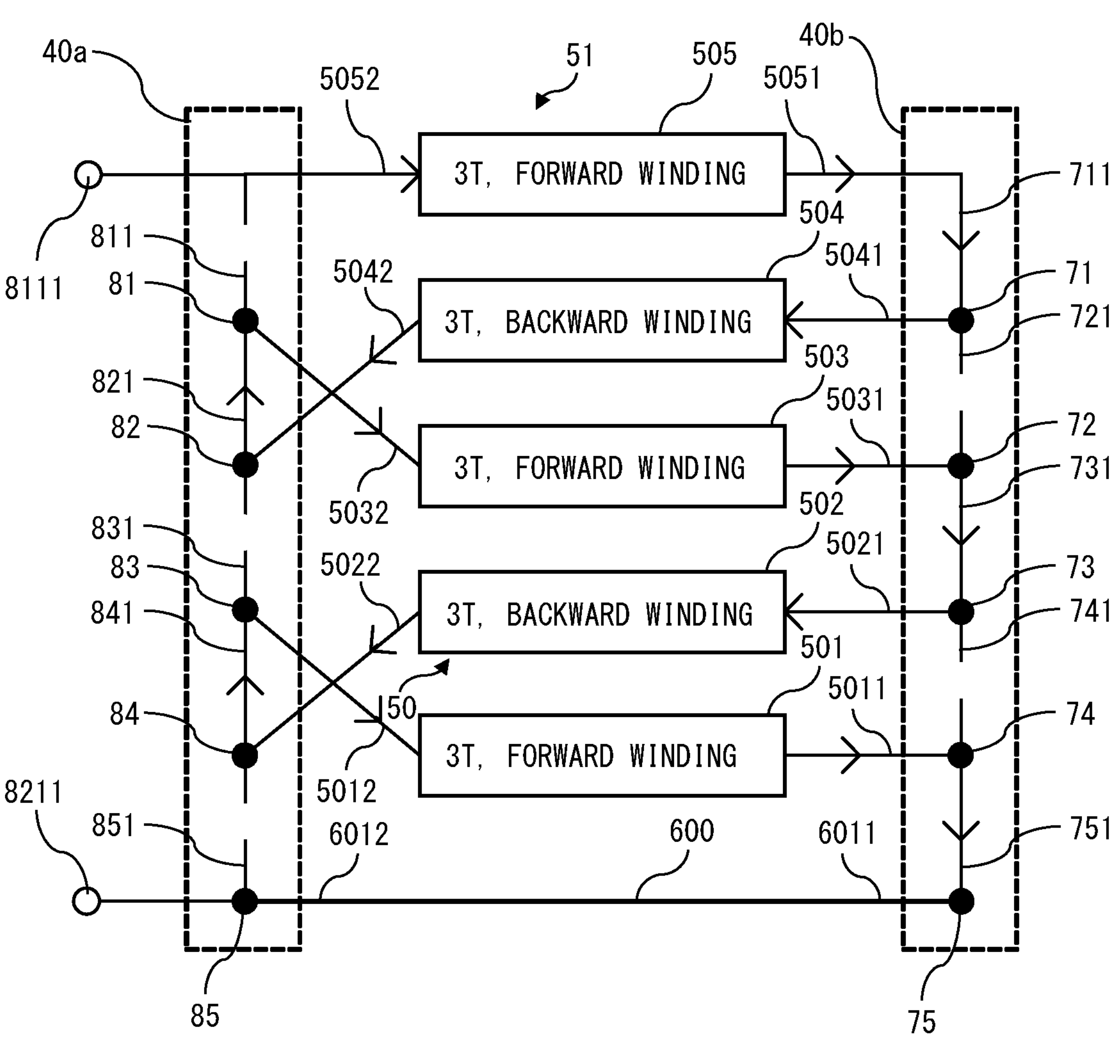
FIG. 28 is a wiring configuration diagram of the primary winding, the first connection portion, and the second connection portion of the transformer according to the second embodiment.
Figure 29:
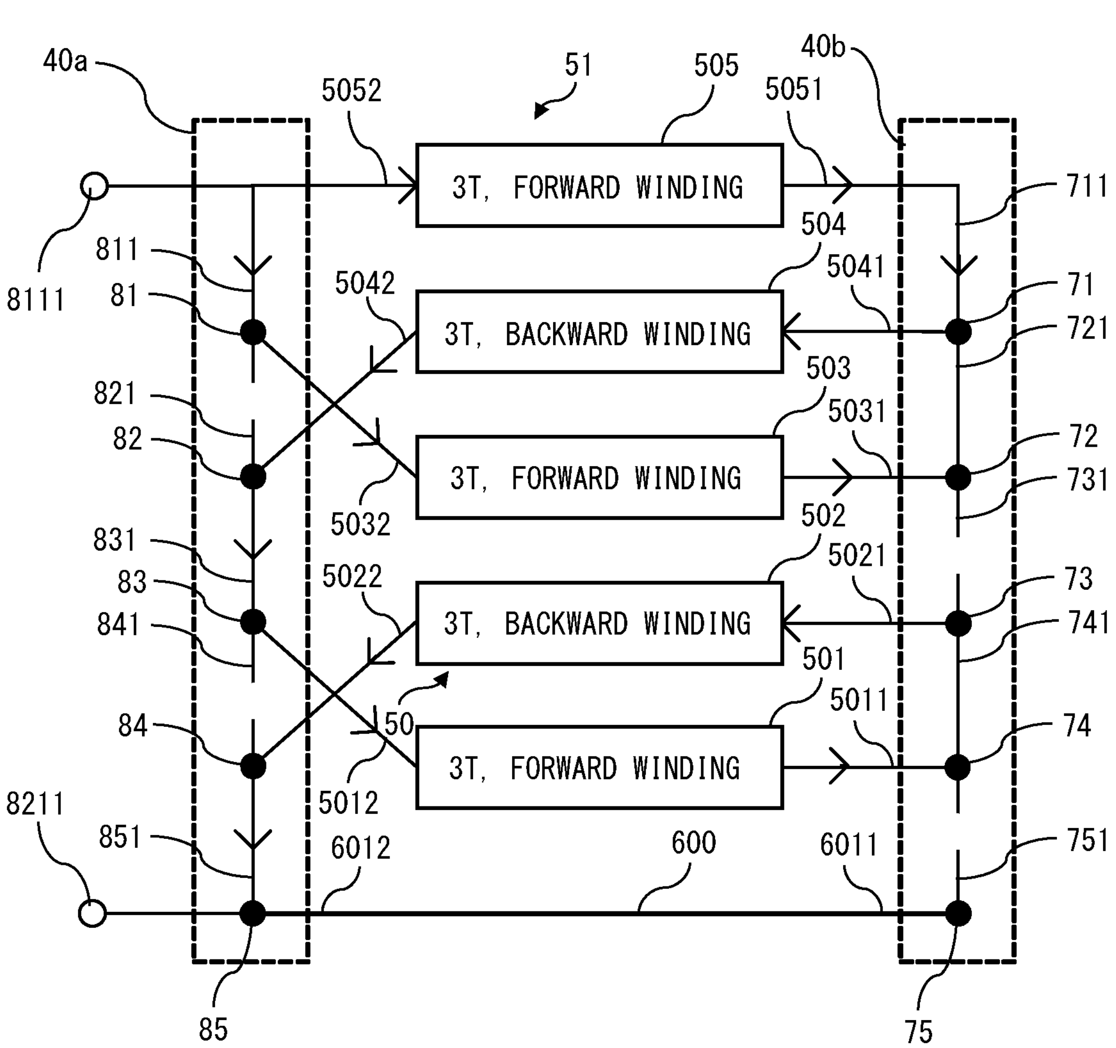
FIG. 29 is another wiring configuration diagram of the primary winding, the first connection portion, and the second connection portion of the transformer according to the second embodiment.
Figure 30:
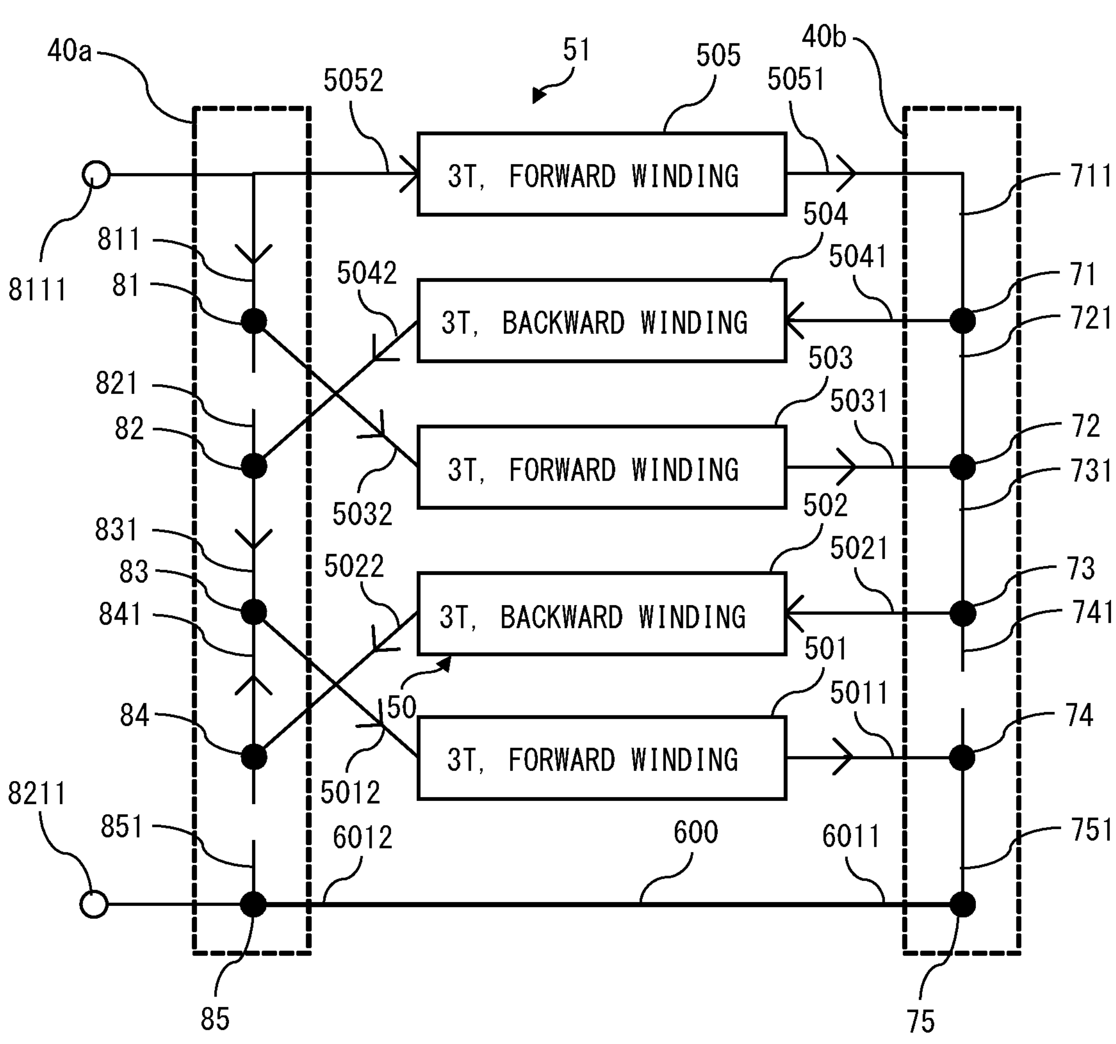
FIG. 30 is another wiring configuration diagram of the primary winding, the first connection portion, and the second connection portion of the transformer according to the second embodiment.

A transformer 3 according to a second embodiment is described. FIG. 23 is a schematic exploded perspective view showing a primary winding 3*a*, a first connection portion 40*a*, and a second connection portion 40*b* of the transformer 3 according to the second embodiment. FIG. 24 is a schematic plan view showing the first connection portion 40*a* and the second connection portion 40*b* of the transformer 3. FIG. 25 is a schematic plan view showing the primary winding 3*a*, the first connection portion 40*a*, and the second connection portion 40*b* of the transformer 3. FIG. 26 is a schematic side view showing the primary winding 3*a* and the first connection portion 40*a* of the transformer 3. FIG. 27 is a cross-sectional view of the primary winding 3*a* of the transformer 3, cut at the position of an A-A cross-section in FIG. 25. FIG. 28 is a wiring configuration diagram of the primary winding 3*a*, the first connection portion 40*a*, and the second connection portion 40*b* of the transformer 3. FIG. 29 is another wiring configuration diagram of the primary winding 3*a*, the first connection portion 40*a*, and the second connection portion 40*b* of the transformer 3. FIG. 30 is another wiring configuration diagram of the primary winding 3*a*, the first connection portion 40*a*, and the second connection portion 40*b* of the transformer 3. The transformer 3 according to the second embodiment includes the second connection portion 40*b* and a coupling tool 600, in addition to the configurations according to the first embodiment.

<Second Connection Portion 40*b* and Coupling Tool 600>

First, configurations that are different from those of the first embodiment are described. The transformer 3 includes the second connection portion 40*b* having a plurality of second conductive parts arranged with an insulation interval therebetween. In FIG. 23, the second connection portion 40*b* before the insulation interval is provided is shown. The second connection portion 40*b* is made from a metal, such as copper, in a shape of a plate. The second connection portion 40*b* is connected to the other of two extending members of each of a plurality of division windings of the at least one divided winding. In the present embodiment, the second connection portion 40*b* is integrated with a winding end portion 5051 being an extending member of a fifth primary winding 505. Each of the plurality of second conductive parts is a mutual connection part which mutually connects two or more extending members. Through provision of the second connection portion 40*b*, a still greater number of connection patterns of the extending member can be configured than in the first embodiment. Since a still greater number of connection patterns of the extending member can be configured, the number of turns in the transformer 3 can be configured in a greater number of kinds. A specific example of the connection pattern of the extending member will be described later.

The transformer 3 includes the coupling tool 600 which connects the first connection portion 40*a* and the second connection portion 40*b*. The coupling tool 600 is made from a metal, such as copper, that is conductive. The coupling tool 600 may be formed by bending a metal plate, or may be formed by bending a bar-shaped metal. The coupling tool 600 has bent structures 6013, 6014 and is provided so as to extend across the wound parts of the division windings. In the coupling tool 600, a connection end portion 6011 is formed in an end portion on the side close to the winding shaft 103, and a connection end portion 6012 is formed in an end portion on the side far from the winding shaft 103. The connection end portion 6011 being an extending member of the coupling tool 600 is connected to the second connection portion 40*b*, and the connection end portion 6012 being an extending member of the coupling tool 600 is connected to the first connection portion 40*a*. Through provision of the coupling tool 600, a still greater number of connection patterns of the extending member can be configured than in the first embodiment. Since a still greater number of connection patterns of the extending member can be configured, the number of turns in the transformer 3 can be configured in a greater number of kinds. The transformer 3 need not necessarily include the coupling tool 600. The transformer 3 may be configured such that the transformer 3 includes the first connection portion 40*a* and the second connection portion 40*b* and does not include the coupling tool 600.

The first connection portion 40*a* is disposed on one of the inner side and the outer side of the wound part, and the second connection portion 40*b* is disposed on the other of the inner side and the outer side of the wound part. In the present embodiment, the first connection portion 40*a* is disposed on the outer side of the wound part, and the second connection portion 40*b* is disposed on the inner side of the wound part. With this configuration, the extending members of the division windings are concentrated on the inner side and the outer side of the wound part. Therefore, the configuration of the extending members of the division windings can be simplified.

<Configuration of Primary Winding 3*a*>

A configuration example of the primary winding 3*a* realized when the number of turns N1 of the primary winding 3*a* is 9, 12, or 15, with the number of turns N2 of the secondary winding 3*b*, 3*c* defined as 1, is described. In the present embodiment, the winding members of the primary winding 3*a* are stacked such that, from the Z-axis negative direction side in FIG. 23 in order, a first primary winding 501, a second primary winding 502, a third primary winding 503, a fourth primary winding 504, and the fifth primary winding 505 are arranged. In the present embodiment, the first primary winding 201, the third primary winding 203, and the fifth primary winding 505 are each the first winding member, and the second primary winding 202 and the fourth primary winding 204 are each the second winding member.

A set winding is composed of one first winding member and one second winding member. The transformer 3 includes a plurality of set windings, and one first winding member or one second winding member. The first connection portion 40*a* is connected to one of the two extending members of each of the plurality of set windings and the one first winding member or the one second winding member. The second connection portion 40*b* is connected to the other of the two extending members of each of the plurality of set windings and the one first winding member or the one second winding member. The first connection portion 40*a* and the second connection portion 40*b* mutually connect the extending members of the plurality of set windings and the extending members of the one first winding member or the one second winding member, in series or in parallel. In the present embodiment, a set winding 50 is composed of the second primary winding 502 and the third primary winding 503, and a set winding 51 is composed of the fourth primary winding 504 and the fifth primary winding 505. The transformer 3 includes the two set windings 50, 51 and the first primary winding 501 being the one first winding member.

The first primary winding 501, the second primary winding 502, the third primary winding 503, the fourth primary winding 504, and the fifth primary winding 505 are each wound around the winding shaft 103 by three turns, and have winding end portions 5011, 5021, 5031, 5041, 5051 each being an extending member on the side close to the winding shaft 103. The first primary winding 501, the second primary winding 502, the third primary winding 503, the fourth primary winding 504, and the fifth primary winding 505 have winding end portions 5012, 5022, 5032, 5042, 5052 each being an extending member on the side far from the winding shaft 103. The first connection portion 40*a* is integrated with the winding end portion 5052 of the fifth primary winding 505. As shown in FIG. 23, the winding end portions 5011, 5021, 5031, 5041 have bent structures 5013, 5023, 5033, 5043 toward the Z-direction, so as to be connected to the second connection portion 40*b*. The winding end portions 5012, 5022, 5032, 5042 have bent structures 5014, 5024, 5034, 5044 toward the Z-direction, so as to be connected to the first connection portion 40*a*.

As shown in FIG. 24, the first connection portion 40*a* has: through-holes 81, 82, 83, 84, 85 to which the winding end portions 5012, 5022, 5032, 5042 and the connection end portion 6012 are connected; mutual connection parts 811, 821, 831, 841, 851 which mutually connect the winding end portion 5012, 5022, 5032, 5042, 5052 and the connection end portion 6012; and external connection parts 8111, 8211 to be connected to the outside. The second connection portion 40*b* has: through-holes 71, 72, 73, 74, 75 to which the winding end portions 5011, 5021, 5031, 5041 and the connection end portion 6011 are connected; and mutual connection parts 711, 721, 731, 741, 751 which mutually connect the winding end portions 5011, 5021, 5031, 5041, 5051 and the connection end portion 6011.

Each of the mutual connection parts 711, 721, 731, 741, 751, 811, 821, 831, 841, 851 is a part that becomes an insulation interval when the part is cut. A part of any of the mutual connection parts 811, 821, 831, 841, 851 is cut, whereby a plurality of first conductive parts arranged with an insulation interval therebetween are formed from the first connection portion 40*a*. A part of any of the mutual connection parts 711, 721, 731, 741, 751 is cut, whereby a plurality of second conductive parts arranged with an insulation interval therebetween are formed from the second connection portion 40*b*. When a plurality of second conductive parts are formed in a state of being cut at the insulation interval, the plurality of second conductive parts can be easily formed. Since the plurality of second conductive parts can be easily formed, productivity of the transformer 3 can be improved. Since parts of these mutual connection parts are exposed from the resin member 301 (not shown), parts of the mutual connection parts can be easily cut.

As shown in FIG. 26, the winding end portion 5032 is connected to the through-hole 81, the winding end portion 5042 is connected to the through-hole 82, the winding end portion 5012 is connected to the through-hole 83, the winding end portion 5022 is connected to the through-hole 84, and the connection end portion 6012 is connected to the through-hole 85. As shown in FIG. 27, the winding end portion 5041 is connected to the through-hole 71, the winding end portion 5031 is connected to the through-hole 72, the winding end portion 5021 is connected to the through-hole 73, the winding end portion 5011 is connected to the through-hole 74, and the connection end portion 6011 is connected to the through-hole 75. The winding end portions and the connection end portions are passed through corresponding through-holes and connected by solder (not shown), for example. Since the winding end portions and the connection end portions are configured to be connected at the through-holes, the connection configuration at the first connection portion 40*a* and the second connection portion 40*b* is simplified, and thus, productivity of the transformer 3 can be improved.

A configuration of the primary winding 3*a* in which the number of turns N1 of the primary winding 3*a* is 15 is described. When 15 turns are to be formed, parts of the mutual connection parts 811, 831, 851 in the first connection portion 40*a* are removed through tie bar cutting, for example. Insulation intervals are formed in the mutual connection parts 811, 831, 851, whereby four first conductive parts are formed. The four first conductive parts are formed in a state of being cut at the three insulation intervals. In the present embodiment, in FIG. 28, the first conductive parts on both sides are two specific first conductive parts, and are the external connection parts 8111, 8211. The center two first conductive parts are non-specific first conductive parts, and are the mutual connection parts 821, 841. The mutual connection part 841 connects the first primary winding 501 and the second primary winding 502 in series, and the mutual connection part 821 connects the third primary winding 503 and the fourth primary winding 504 in series.

Further, parts of the mutual connection parts 721, 741 in the second connection portion 40*b* are removed through tie bar cutting, for example. Insulation intervals are formed in the mutual connection parts 721, 741, whereby three second conductive parts are formed. The three second conductive parts are formed in a state of being cut at the two insulation intervals. In the present embodiment, in FIG. 28, the three second conductive parts are the mutual connection parts 711, 731, 751. The mutual connection part 731 connects the second primary winding 502 and the third primary winding 503 in series, the mutual connection part 711 connects the fourth primary winding 504 and the fifth primary winding 505 in series, and the mutual connection part 751 connects the first primary winding 501 and the coupling tool 600 in series.

With this configuration, as shown in FIG. 28, the set winding 50 and the set winding 51 are connected in series at the mutual connection part 821, and further, the first primary winding 501 is connected in series. Therefore, the transformer 3 in which the number of primary turns N1 is 15 can be realized.

A configuration of the primary winding 3*a* in which the number of turns N1 of the primary winding 3*a* is 12 is described. When 12 turns are to be formed, parts of the mutual connection parts 821, 841 in the first connection portion 40*a* are removed through tie bar cutting, for example. Insulation intervals are formed in the mutual connection parts 821, 841, whereby three first conductive parts are formed. The three first conductive parts are formed in a state of being cut at the two insulation intervals. In the present embodiment, in FIG. 29, the first conductive parts on both sides are two specific first conductive parts, and are the external connection parts 8111, 8211. The center first conductive part is a non-specific first conductive part, and is the mutual connection part 831. The mutual connection part 831 connects the first primary winding 501 and the fourth primary winding 504 in series, the mutual connection part 811 connects the third primary winding 503 and the fifth primary winding 505 in series, and the mutual connection part 851 connects the second primary winding 502 and the external connection part 8211 in series.

Further, parts of the mutual connection parts 731, 751 in the second connection portion 40*b* are removed through tie bar cutting, for example. Insulation intervals are formed in the mutual connection parts 731, 751, whereby two second conductive parts are formed. In the present configuration, as shown in FIG. 29, the part of the coupling tool 600 is not used. The two second conductive parts are formed in a state of being cut at the two insulation intervals. In the present embodiment, the two second conductive parts are the mutual connection parts 711, 721, and the mutual connection part 741. The mutual connection part 741 connects the first primary winding 501 and the second primary winding 502 in series, and the mutual connection parts 711, 721 connect the third primary winding 503, the fourth primary winding 504, and the fifth primary winding 505 in parallel.

With this configuration, as shown in FIG. 29, the third primary winding 503 and the fifth primary winding 505 are connected in parallel, and further, the fourth primary winding 504, the first primary winding 501, and the second primary winding 502 are connected in series. Therefore, the transformer 3 in which the number of primary turns N1 is 12 can be realized.

A configuration of the primary winding 3*a* in which the number of turns N1 of the primary winding 3*a* is 9 is described. When 9 turns are to be formed, parts of the mutual connection parts 821, 851 in the first connection portion 40*a* are removed through tie bar cutting, for example. Insulation intervals are formed in the mutual connection parts 821, 851, whereby three first conductive parts are formed. The three first conductive parts are formed in a state of being cut at the two insulation intervals. In the present embodiment, in FIG. 30, the first conductive parts on both sides are two specific first conductive parts, and are the external connection parts 8111, 8211. The center first conductive parts are non-specific first conductive parts, and are the mutual connection parts 831, 841. The mutual connection parts 831, 841 connect the first primary winding 501, the second primary winding 502, and the fourth primary winding 504 in parallel, the mutual connection part 811 connects the third primary winding 503 and the fifth primary winding 505 in series, and the coupling tool 600 and the external connection part 8211 are connected.

Further, a part of the mutual connection part 741 in the second connection portion 40*b* is removed through tie bar cutting, for example. An insulation interval is formed in the mutual connection part 741, whereby two second conductive parts are formed. The two second conductive parts are formed in a state of being cut at one insulation interval. In the present embodiment, the two second conductive parts are the mutual connection parts 711, 721, 731 and the mutual connection part 751. The mutual connection parts 711, 721, 731 connect the second primary winding 502, the third primary winding 503, the fourth primary winding 504, and the fifth primary winding 505 in parallel, and the mutual connection part 751 connects the first primary winding 501 and the coupling tool 600 in series.

With this configuration, as shown in FIG. 30, the set winding 50 and the set winding 51 are connected in parallel at the mutual connection part 811, and further, the first primary winding 501 is connected in series. Therefore, the transformer 3 in which the number of primary turns N1 is 9 can be realized.

As described above, when series connection and parallel connection of the division windings are switched at the first connection portion 40*a* having a plurality of first conductive parts arranged with an insulation interval therebetween and at the second connection portion 40*b* having a plurality of second conductive parts arranged with an insulation interval therebetween, the number of turns N1 of the primary winding 3*a* can be switched between 9, 12, and 15 while the core portion and the wound parts of the division windings of the transformer 3 are used in common without being changed. Therefore, since various input voltage specifications can be easily coped with, there is no need to redesign the core portion and the winding members of the transformer 3, and thus, the same kinds of materials forming the transformer 3 can be used in common. Since the same kinds of materials forming the transformer 3 are used in common, increase in the number of design steps when the number of turns has been changed and in the kinds of the transformer 3 due to dedicated design is suppressed, and production management during manufacture of the transformer 3 and inventory management thereof are facilitated. Therefore, productivity of the transformer 3 can be improved. Switching between series connection and parallel connection of the division windings can be performed at the first connection portion 40*a* and the second connection portion 40*b*. Thus, there is no need to prepare and replace dedicated members according to each connection in order to change the connection, and production management during manufacture and inventory management can be easily performed.

In the second embodiment, an example in which the first connection portion 40*a* and the second connection portion 40*b* are provided at both ends of one division winding out of the division windings of the primary winding 3*a*, and the coupling tool 600 is provided has been shown. However, the configuration is not limited to the configuration in which all of these are provided. For example, the first embodiment may be configured such that the first connection portion 40*a* and the second connection portion 40*b* are provided, and the coupling tool 600 is not provided. In a case where the first connection portion 40*a* and the second connection portion 40*b* are provided and the coupling tool 600 is provided, it is possible to configure, as the number of turns of the primary winding 3*a*, three patterns in which a pattern of 9 turns is added to the two patterns of 12 turns and 6 turns shown in the first embodiment.

When the transformers 3 in which the respective numbers of primary turns N1 are 15, 12, and 9 are compared with each other, current increases by an amount corresponding to the ratio of the number of turns due to decrease in the number of primary turns N1. When the transformer 3 is implemented in the housing of the power conversion device 100, since the transformer 3 is of a planar type, a cooler is disposed below the first primary winding 501. Therefore, with respect to the primary winding 3*a* and the secondary winding 3*b*, 3*c*, heat dissipation is performed along a path in a direction from the positive side to the negative side in the Z-axis via the resin member 301 shown in the first embodiment. At that time, heat of the third primary winding 503, the fourth primary winding 504, and the fifth primary winding 505 disposed on the Z-axis positive direction side is less likely to be dissipated. In the present embodiment, in the transformer 3 in which the number of primary turns N1 is 12, the third primary winding 503 and the fifth primary winding 505 are connected in parallel. In the transformer 3 in which the number of primary turns N1 is 9, the third primary winding 503 and the fifth primary winding 505, and the second primary winding 502 and the fourth primary winding 504 are connected in parallel. With this configuration in which the division windings are connected in parallel, the amount of flowing current can be halved. Although heat of the division windings disposed on the Z-axis positive direction side is less likely to be dissipated, when the division windings disposed on the Z-axis positive direction side are connected in parallel, heat generation due to current that increases by an amount corresponding to the ratio of the number of turns can be coped with.

<Product Group of Transformer 3>

A transformer product group including a plurality of models of transformers 3 is described. Each of the plurality of models of transformers 3 includes a second connection portion having a plurality of second conductive parts arranged with an insulation interval therebetween, in addition to the configurations of the plurality of models of transformers 3 shown in the first embodiment. The second connection portion is connected to the other of the two extending members of each of the plurality of division windings of the at least one divided winding. The part, of the second connection portion, connected to the other of the two extending members of the plurality of division windings is defined as a connected portion of the second connection portion. The plurality of the connected portions of the second connection portions are arranged with a disposition interval therebetween. The insulation interval is provided at the part of the disposition interval. The part of the disposition interval, in the second connection portion, in which the insulation interval is provided is different among the models of transformers 3, and a second conductive part is present in the part of the disposition interval in which the insulation interval is not provided.

When the product group of the transformer 3 is configured in this manner, a plurality of models of transformers 3 having different connection configurations at the first connection portion and the second connection portion can be easily managed as a product group. Since production management during manufacture of the transformers 3 and inventory management thereof are facilitated, productivity of the transformer 3 can be improved.

<Manufacturing Method for Transformer 3>

With respect to a manufacturing method for the transformer 3, steps that are different from those of the manufacturing method for the transformer 3 shown in the first embodiment are described. In the member preparation step of the transformer 3 according to the present embodiment, a second connection member to be the second connection portion **40*b*** is further prepared. In the connecting step, one or both of the primary winding and the secondary winding are connected to the second connection member. The other of the two extending members of each of the plurality of division windings of the at least one divided winding is connected, with a disposition interval therebetween, to the second connection member. In the cutting step, a different disposition interval, out of the plurality of disposition intervals in the second connection member, is cut in accordance with the model of the transformer.

When the transformer 3 is manufactured in this manner, the model of the transformer can be easily changed by cutting different disposition intervals in the first connection member and the second connection member in the cutting step. Therefore, a plurality of models of transformers 3 can be easily manufactured. Since a plurality of models of transformers 3 can be easily manufactured, productivity of the plurality of models of transformers 3 can be improved.

As described above, the transformer 3 according to the second embodiment includes the second connection portion **40*b* having a plurality of second conductive parts arranged with an insulation interval therebetween, the second connection portion 40*b* is connected to the other of the two extending members of each of the plurality of division windings of the at least one divided winding, and each of the plurality of second conductive parts is a mutual connection part which mutually connects two or more extending members. Therefore, a still greater number of connection patterns of the extending member can be configured than in the first embodiment. Since a still greater number of connection patterns of the extending member can be configured, the number of turns in the transformer 3 can be configured in a greater number of kinds. Since various input voltage specifications can be easily coped with, there is no need to redesign the core portion and the division windings, and thus, the same kinds of materials forming the transformer 3 can be used in common. Since the same kinds of materials forming the transformer 3 are used in common, increase in the number of design steps when the number of turns has been changed and in the kinds of the transformer 3 due to dedicated design is suppressed, and production management during manufacture of the transformer 3 and inventory management thereof are facilitated. Therefore, productivity of the transformer 3** can be improved.

When a plurality of second conductive parts are formed in a state of being cut at the insulation interval, the plurality of second conductive parts can be easily formed. Since the plurality of second conductive parts can be easily formed, productivity of the transformer 3 can be improved. When the coupling tool 600 connected to the first connection portion **40*a* and the second connection portion 40*b* is provided, a still greater number of connection patterns of the extending member can be configured than in the first embodiment. Since a still greater number of connection patterns of the extending member can be configured, the number of turns in the transformer 3 can be configured in a greater number of kinds. When the first connection portion 40*a* is disposed on one of the inner side and the outer side of the wound part and the second connection portion 40*b*** is disposed on the other of the inner side and the outer side of the wound part, the extending members of the division windings are concentrated on the inner side and the outer side of the wound part. Therefore, the configuration of the extending members of the division windings can be simplified.

The transformer 3 includes: the first connection portion **40*a* having a plurality of first conductive parts arranged with an insulation interval therebetween, and the second connection portion 40*b* having a plurality of second conductive parts arranged with an insulation interval therebetween; a plurality of set windings each composed of one first winding member and one second winding member; and one first winding member or one second winding member. The first connection portion 40*a* is connected to one of the two extending members of each of the plurality of set windings and the one first winding member or the one second winding member. The second connection portion is connected to the other of the two extending members of each of the plurality of set windings and the one first winding member or the one second winding member. The first connection portion 40***a* and the second connection portion 40*b* mutually connect the extending members of the plurality of set windings and the extending members of the one first winding member or the one second winding member, in series or in parallel. In such a case, when series connection and parallel connection of the division windings are switched, the number of turns in the transformer 3 can be configured in a greater number of kinds, while the core portion and the wound parts of the division windings of the transformer 3 are used in common without being changed.

Third Embodiment

Figure 31:
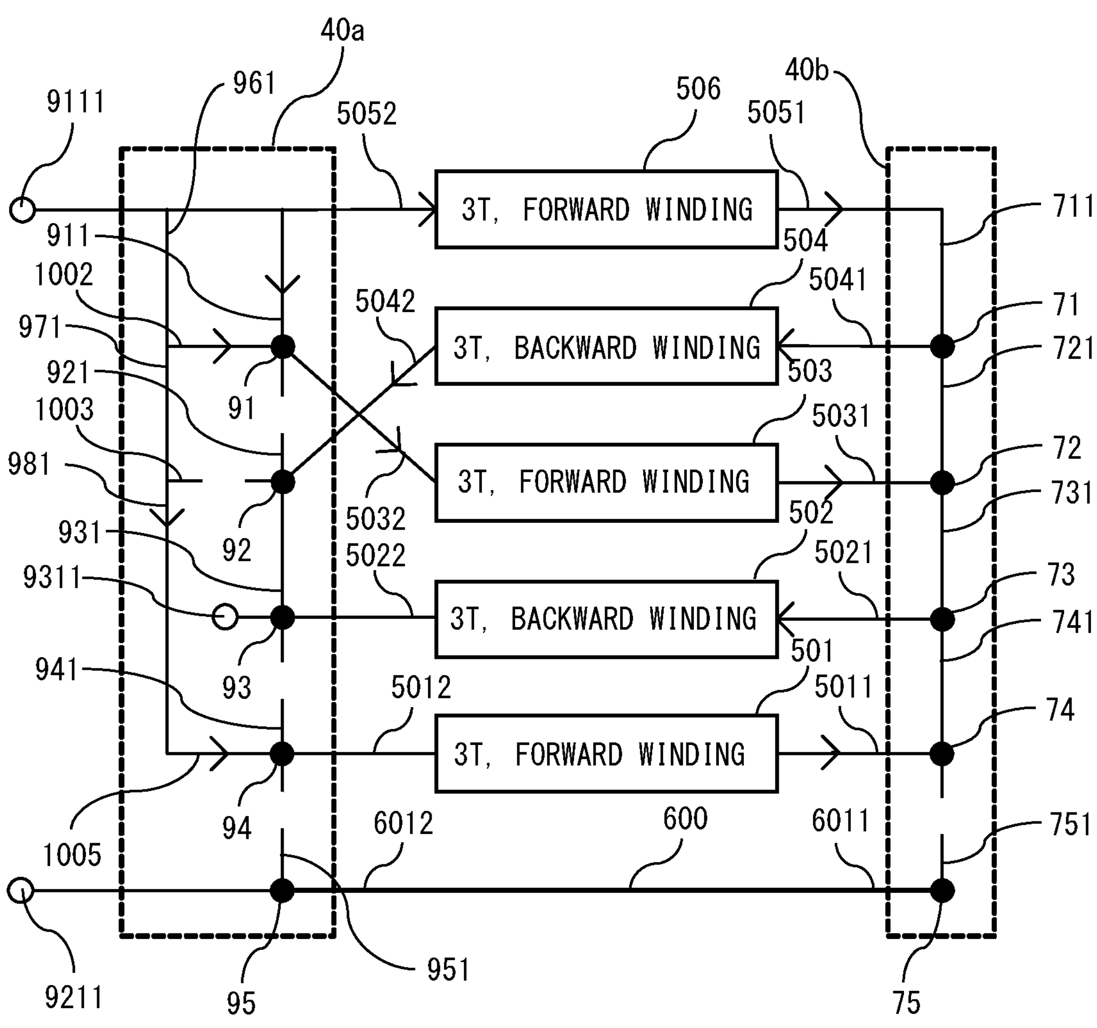
FIG. 31 is a wiring configuration diagram of a primary winding, a first connection portion, and a second connection portion of the transformer according to a third embodiment.
Figure 32:
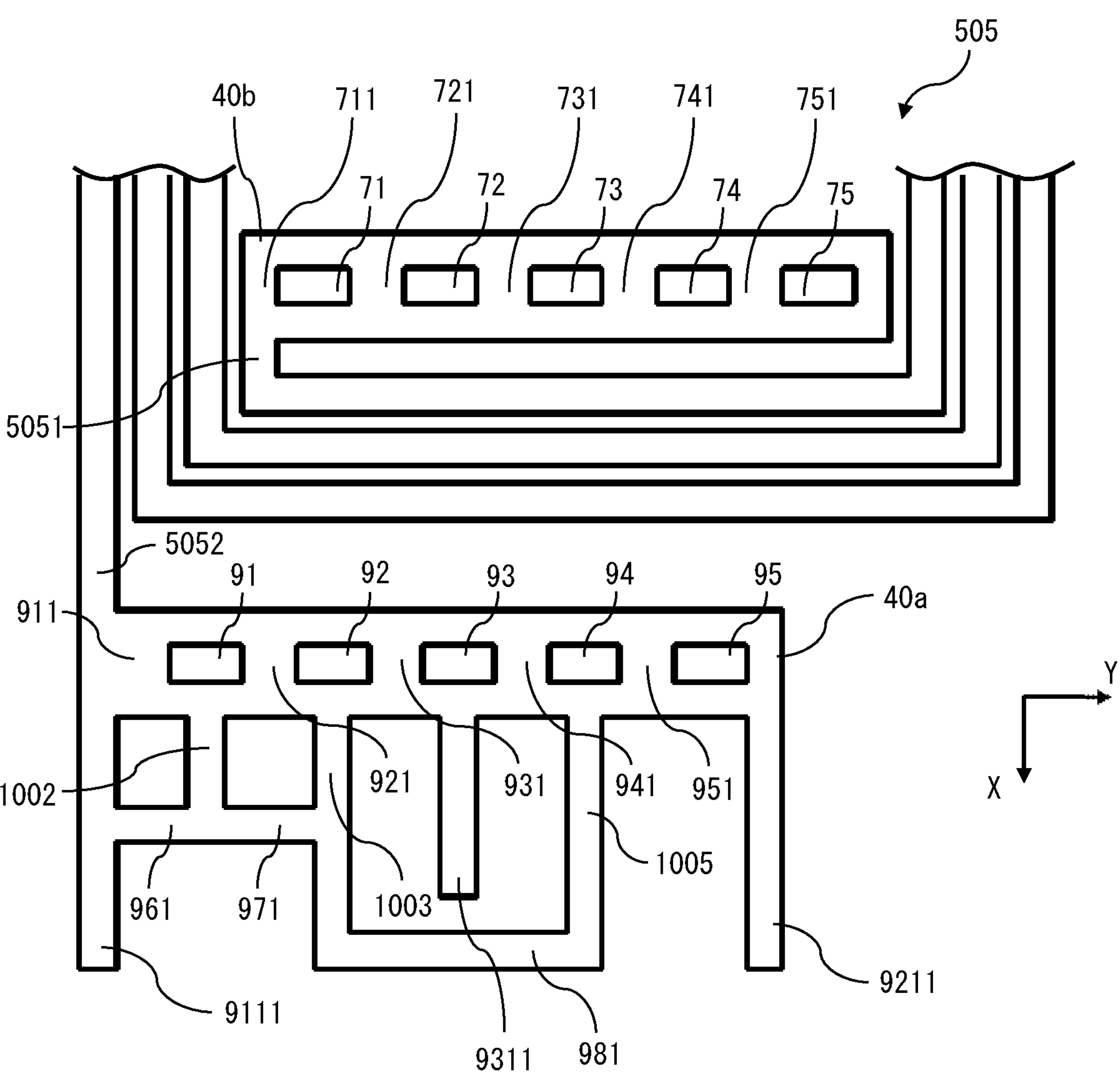
FIG. 32 is a schematic plan view showing the first connection portion and the second connection portion of the transformer according to the third embodiment.

A transformer 3 according to a third embodiment is described. FIG. 31 is a wiring configuration diagram of a primary winding 3*a*, a first connection portion 40*a*, and a second connection portion 40*b* according to the third embodiment. FIG. 32 is a schematic plan view showing the first connection portion 40*a* and the second connection portion 40*b* of the transformer 3. The transformer 3 according to the third embodiment includes the first connection portion 40*a* that has a configuration different from that in the second embodiment, and the primary winding 3*a* is configured such that the number of turns N1 of the primary winding 3*a* is 6. Since configurations other than the first connection portion 40*a* are the same as those in the second embodiment, the same configurations are not described.

As shown in FIG. 32, the first connection portion 40*a* has: through-holes 91, 92, 93, 94, 95 to which the winding end portions 5012, 5022, 5032, 5042 and the connection end portion 6012 are connected; mutual connection parts 911, 921, 931, 941, 951 which mutually connect the winding end portions 5012, 5022, 5032, 5042, 5052 and the connection end portion 6012; and external connection parts 9111, 9211, 9311 to be connected to the outside. The first connection portion 40*a* further has mutual connection parts 961, 971, 981 formed in parallel to the y-axis; and mutual connection parts 1002, 1003, 1005 formed so as to connect the mutual connection parts 961, 971, 981. Each of the mutual connection parts is a part that becomes an insulation interval when the part is cut.

As shown in FIG. 31, the winding end portion 5032 is connected to the through-hole 91, the winding end portion 5042 is connected to the through-hole 92, the winding end portion 5022 is connected to the through-hole 93, the winding end portion 5012 is connected to the through-hole 94, and the connection end portion 6012 is connected to the through-hole 95. The winding end portion 5041 is connected to the through-hole 71, the winding end portion 5031 is connected to the through-hole 72, the winding end portion 5021 is connected to the through-hole 73, the winding end portion 5011 is connected to the through-hole 74, and the connection end portion 6011 is connected to the through-hole 75. The winding end portions and the connection end portions are passed through corresponding through-holes and connected by solder (not shown), for example.

A configuration of the primary winding 3*a* in which the number of turns N1 of the primary winding 3*a* is 6 is described. When 6 turns are to be formed, parts of the mutual connection parts 921, 941, 951, 1003 in the first connection portion 40*a* are removed through tie bar cutting, for example. Insulation intervals are formed in the mutual connection parts 921, 941, 951, 1003, whereby two first conductive parts are formed. Since the insulation intervals are formed, the mutual connection parts 911, 961, 971, 981, 1002, 1005 connect the first primary winding 501, the third primary winding 503, and the fifth primary winding 505 in parallel. The mutual connection part 931 connects the second primary winding 502 and the fourth primary winding 504 in series.

Further, a part of the mutual connection part 751 in the second connection portion 40*b* is removed through tie bar cutting, for example. An insulation interval is formed in the mutual connection part 751, whereby one second conductive part is formed. The reason why the number of second conductive parts is one is that the coupling tool 600 is not used in the present embodiment. Since the coupling tool 600 is not used, the external connection part 9211 connected to the coupling tool 600 is not used, either. The mutual connection parts 711, 721, 731, 741 connect the first primary winding 501, the second primary winding 502, the third primary winding 503, the fourth primary winding 504, and the fifth primary winding 505 in parallel. Since the number of second conductive parts is one, a configuration in which the second connection portion 40*b* is not provided and the winding end portions of the division windings are mutually connected may be adopted. Since the present embodiment is described as a modification of the second embodiment, the coupling tool 600 and the second connection portion 40*b* are provided.

With this configuration, as shown in FIG. 31, the first primary winding 501, the third primary winding 503, and the fifth primary winding 505 connected in parallel and the second primary winding 502 and the fourth primary winding 504 are connected in series. Therefore, the transformer 3 in which the number of primary turns N1 is 6 can be realized.

When the first connection portion 40*a* and the second connection portion 40*b* according to the present embodiment are used, and any of the mutual connection parts is caused to serve as an insulation interval, the transformer 3 in which the number of primary turns N1 is 15, 12, 9, 6, 3 can be realized. When the configuration of the first connection portion 40*a* is changed in this manner, even when division windings having the same number of turns and the same number of layers as those in the second embodiment are used, the number of turns of the primary winding 3*a* can be changed. Irrespective of the number of turns of one division winding and the number of layers of windings, when the first connection portion 40*a* and the second connection portion 40*b* are provided at end portions of the division winding, the transformer 3 in which the number of turns can be changed can be realized.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC power supply
2 single-phase inverter
2*a*, 2*b*, 2*c*, 2*d* semiconductor switching element
3 transformer
3*a* primary winding
3*b* secondary winding
3*c* secondary winding
4 rectification circuit
4*a*, 4*b* diode
5 reactor
6 smoothing capacitor
7 load
30, 31, 32, 33 winding unit
40*a* first connection portion
40*b* second connection portion
50, 51 set winding
100 power conversion device
101 lower core
102 upper core
103 winding shaft
103*a* winding axis
201, 205, 501 first primary winding
202, 502 second primary winding
203, 206, 503 third primary winding
204, 504 fourth primary winding
505 fifth primary winding
300 winding body
301 resin member
301*a* exposure portion
302 cooler
303 heat transfer member
2011, 2021, 2031, 2041, 2051, 2061, 2012, 2022, 2032, 2042, 2052, 2062, 5011, 5021, 5031, 5041, 5051, 5012, 5022, 5032, 5042, 5052 winding end portion
2013, 2023, 2033, 5013, 5023, 5033, 5043, 5014, 5024, 5034, 5044, 6013, 6014 bent structure
41, 42, 43, 44, 71, 72, 73, 74, 75, 81, 82, 83, 84, 85, 91, 92, 93, 94, 95 through-hole
411, 421, 431, 711, 721, 731, 741, 751, 811, 821, 831, 841, 851, 911, 921, 931, 941, 951, 961, 971, 981, 1002, 1003, 1005 mutual connection part
451, 461, 471 insulation interval
4111, 4211, 8111, 8211, 9111, 9211, 9311 external connection part
600 coupling tool
6011, 6012 connection end portion

What is claimed is:

1. A transformer comprising:
a core portion for forming a magnetic circuit;
a primary winding and a secondary winding wound at the core portion; and
a first connection portion having a plurality of first conductive parts arranged with an insulation interval therebetween, wherein
one or both of the primary winding and the secondary winding are divided into a plurality of division windings, and each of the plurality of division windings of the at least one divided winding has a wound part wound at the core portion, and two extending members extending from both ends of the wound part,
the first connection portion is connected to one of the two extending members of each of the plurality of division windings of the at least one divided winding,
when the first connection portion has two of the first conductive parts, each of the two first conductive parts is an external connection part to be connected to outside and is a mutual connection part which mutually connects two or more of the extending members, and
when the first connection portion has three or more of the first conductive parts, each of two specific ones of the first conductive parts is the external connection part, or is the external connection part and is the mutual connection part, and each of one or more non-specific ones of the first conductive parts other than the two specific first conductive parts is the mutual connection part.

2. The transformer according to claim 1, wherein
the plurality of first conductive parts are formed in a state of being cut at the insulation interval.

3. The transformer according to claim 1, comprising
a second connection portion having a plurality of second conductive parts arranged with an insulation interval therebetween, wherein
the second connection portion is connected to another of the two extending members of each of the plurality of division windings of the at least one divided winding, and
each of the plurality of second conductive parts is the mutual connection part which mutually connects two or more of the extending members.

4. The transformer according to claim 3, wherein
the plurality of second conductive parts are formed in a state of being cut at the insulation interval.

5. The transformer according to claim 3, comprising
a coupling tool which connects the first connection portion and the second connection portion.

6. The transformer according to claim 1, wherein
another of the two extending members of each of the plurality of division windings of the at least one divided winding is mutually connected.

7. The transformer according to claim 3, wherein
the first connection portion is disposed on one of an inner side and an outer side of the wound part, and
the second connection portion is disposed on another of the inner side and the outer side of the wound part.

8. The transformer according to claim 1, wherein
the primary winding and the secondary winding are formed by a plurality of winding members,
each of the plurality of winding members is formed in a shape of a plate that is curved on a same plane orthogonal to an extending direction of a winding shaft which is a part of the core portion and around which the windings are wound, and each surface of the plate is orthogonal to the extending direction of the winding shaft, and
the plurality of winding members are stacked in the extending direction of the winding shaft.

9. The transformer according to claim 8, wherein
one of the two extending members of each of the plurality of division windings of the at least one divided winding extends from an end portion on a side far from the winding shaft, and
another of the two extending members of each of the plurality of division windings of the at least one divided winding extends from an end portion on a side close to the winding shaft.

10. The transformer according to claim 8, wherein
the first connection portion is formed from a metal in a shape of a plate, and the first connection portion and one of the two extending members of any of the plurality of division windings of the at least one divided winding are integrated with each other.

11. The transformer according to claim 10, wherein the division winding that has the extending member integrated with the first connection portion is disposed on an outermost side among the stacked winding members, when viewed in the extending direction of the winding shaft.

12. The transformer according to claim 8, wherein the plurality of winding members have at least one first winding member that has the wound part that is wound around the winding shaft clockwise, when viewed in the extending direction of the winding shaft, from a side far from the winding shaft toward a side close to the winding shaft, and at least one second winding member that has the wound part that is wound around the winding shaft counterclockwise, when viewed in the extending direction of the winding shaft, from the side far from the winding shaft toward the side close to the winding shaft.

13. The transformer according to claim 12, comprising a winding unit composed of one of the at least one first winding member and one of the at least one second winding member, wherein end portions on the side close to the winding shaft of the first winding member and the second winding member in the winding unit are mutually connected, and the respective extending members extend from end portions on the side far from the winding shaft of the first winding member and the second winding member.

14. The transformer according to claim 13, comprising a plurality of the winding units, wherein the plurality of the winding units have a same winding direction with each other, and the first connection portion mutually connects the extending members of the plurality of the winding units in series or in parallel.

15. The transformer according to claim 12, comprising: a plurality of set windings each composed of one of the at least one first winding member and one of the at least one second winding member, and one of the at least one first winding member or one of the at least one second winding member; and a second connection portion having a plurality of second conductive parts arranged with an insulation interval therebetween, wherein the first connection portion is connected to one of the two extending members of each of the plurality of set windings and the one first winding member or the one second winding member, the second connection portion is connected to another of the two extending members of each of the plurality of set windings and the one first winding member or the one second winding member, and the first connection portion and the second connection portion mutually connect the extending members of the plurality of set windings and the extending members of the one first winding member or the one second winding member, in series or in parallel.

16. The transformer according to claim 1, wherein a winding, out of the primary winding and the secondary winding, that has a greater number of turns of the wound part is the plurality of division windings of the at least one divided winding.

17. The transformer according to claim 1, wherein a part or entirety of the primary winding and the secondary winding is sealed by a resin member.

18. The transformer according to claim 17, wherein a part of the mutual connection part is exposed from the resin member.

19. The transformer according to claim 17, comprising a cooler thermally connected to the resin member, wherein the resin member has, on the cooler side, an exposure portion in which a part of one or both of the primary winding and the secondary winding is exposed, and the one or both of the primary winding and the secondary winding are thermally connected, at the exposure portion, to the cooler via a heat transfer member.

20. A power conversion device comprising: a plurality of semiconductor switching elements which are connected to a DC power supply, and which convert inputted DC power into AC power and output the AC power; the transformer, according to claim 1, which converts voltage of the AC power outputted from the plurality of semiconductor switching elements and outputs resultant voltage; and a rectification circuit which rectifies output of the transformer.

* * * * *